United States Patent
Capella et al.

(10) Patent No.: US 9,712,984 B1
(45) Date of Patent: Jul. 18, 2017

(54) SYSTEM AND METHOD FOR SENDING MESSAGES

(71) Applicant: Higher Ground LLC, Palo Alto, CA (US)

(72) Inventors: Michael Glenn Capella, Santa Rosa, CA (US); David Daugherty, Jackson, CA (US); Shmuel Shaffer, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

(21) Appl. No.: 15/421,900

(22) Filed: Feb. 1, 2017

(51) Int. Cl.
*H04W 4/14* (2009.01)
*H04L 29/12* (2006.01)

(52) U.S. Cl.
CPC ........... *H04W 4/14* (2013.01); *H04L 61/2069* (2013.01)

(58) Field of Classification Search
CPC ....................................................... H04L 67/92
See application file for complete search history.

(56) References Cited

U.S. PATENT DOCUMENTS

| 6,771,974 B1* | 8/2004 | Sim .................... H04M 1/72552 340/7.21 |
| 2011/0032847 A1* | 2/2011 | Allen .................... H04L 67/14 370/276 |

\* cited by examiner

*Primary Examiner* — Nizar Sivji
(74) *Attorney, Agent, or Firm* — Panitch Schwarze Belisario & Nadel LLP

(57) ABSTRACT

A system for exchanging messages between a business user and a mobile device, and methods for making and using the same. The system may include a business server, an application programming interface ("API") and/or an SMS database. The business server may be configured to exchange messages with the business user and to obtain a public identifier for the business user to enable duplex message exchange between the business user and the mobile device by either retrieving the public identifier or associating the business user with the mobile device and a public identifier. The business user may be unambiguously determined according to the public identifier or a combination of the mobile device and the public identifier, which may enable the mobile device to direct a reply message to the business user that may be the sender of a direct message.

29 Claims, 13 Drawing Sheets

SYSTEM AND METHOD FOR SENDING MESSAGES

FIELD OF ENDEAVOR

Aspects of the present disclosure relate to systems and techniques that may be used to facilitate exchanging messages between a business message service and mobile devices.

BACKGROUND

Short message service ("SMS"), or "text messaging", is a text-based messaging service that may be used by telephones, computer applications, the world wide web, mobile phones or other mobile devices. A basic SMS system, typically run by an SMS service provider, is usually a one-to-one communication configuration, e.g., messages exchanged between two mobile phones, or a one-to-many configuration, e.g., messages broadcasted to multiple mobile phones. A recipient of a message also receives metadata of the message, including a sender identifier and a recipient identifier, e.g., the sender's phone number and the recipient's phone number. The recipient of the message is able send a reply message back to the sender using the sender identifier because it may unambiguously identify the sender using the sender identifier of the message.

However, this approach requires a public identifier, i.e., a phone number, for each message sender, which may be cost inefficient. For example, certain business companies have a number of users who use SMS to exchange messages with other SMS service users. Some businesses have developed messaging service that facilitates sending messages from a server. In order to facilitate the users to exchange messages with users of other SMS services, e.g., public SMS services, a business messaging service may have to rent a public identifier for each user of the business messaging service, and have the server of the business messaging service use the public identifier of the user sending the message when sending a message to a message recipient. However, for services with a large number of users, this approach may be cost inefficient or even prohibitively expensive.

In order to reduce costs of such business messaging services, a business operator may rent a limited number of identifiers from an SMS service provider, e.g., a limited number of phone numbers, which may be used as sender identifiers to be included in the metadata of the messages being sent. Because the number of the identifiers is limited, the identifiers may only identify the business server of the business messaging service. If a message recipient responds with a reply message using the sender identifier, the reply message will be directed to the business server as opposed to an actual user that used the business server to send the message, and the server may not be able to identify the user for whom the reply message is intended.

In a practical satellite-based communication system, Higher Ground LLC's SatPaq™ messaging system provides messaging services to users in remote or isolated areas not served by any cellular networks. The SatPaq™ system communicates with SMS systems, e.g., wireless systems, via at least a satellite and a ground station. In the SatPaq™ system, many SatPaq™ users may send messages via the satellite and the ground station to mobile phones and/or computing devices. The metadata of a message sent by a SatPaq™ user may include the recipient's identifier, or a phone number of a mobile phone, and an identifier of the ground station. In order to enable any SatPaq™ users to send messages to users of the SMS systems and to receive reply message from the users of the SMS systems, the SatPaq™ system needs to send each of the messages with a unique identifier of the applicable SatPaq™ user. Hence, the SatPaq™ system may require renting one identifier, e.g., a phone number, from an SMS system for each SatPaq™ user, which may be cost ineffective or even prohibitively expensive.

In order to reduce costs for renting the identifiers, the SatPaq™ system may rent a limited number of identifiers from an SMS system, which may identify the server of the SatPaq™ system. With a recipient's identifier, e.g., a phone number, the message may be transmitted from the user of the SatPaq™ system to the recipient. However, when the recipient sends a reply message intended to the SatPaq™ user, the reply message may not be routed to the intended SatPaq™ user because the recipient server and the ground station of the SatPaq™ system do not, under such circumstances, have sufficient information to identify the specific SatPaq™ user, so the ground station cannot route the message back to the specific SatPaq™ user.

Various other business systems, such as accommodation booking systems and airlines and railway systems may encounter similar issues, in which the system is capable of sending out notifications, but does not provide a means by which to directly respond to the sender of the message. For example, an airline may permit a traveler to receive various types of alerts, e.g., via SMS. This is generally done by a person who works for the airline or is associated with the airline via a central computer/SMS transmission facility of the airline, which is associated with a single public identifier. However, if the traveler wants to follow up on the alert, e.g., with a question, if the traveler simply replies to the message via SMS (i.e., using the public identifier), the traveler's follow-up message goes to the central computer/SMS transmission facility, but the central computer/SMS transmission facility may generally be unable to route the follow-up message to the specific sender of the original message.

In view of the foregoing reasons, it may be desirable to have a system and method for uniquely identifying a sender of a message in a cost efficient manner, e.g. without renting a unique identifier/phone number for each sender, when the sender uses a business-type messaging service.

SUMMARY OF THE DISCLOSURE

Various aspects of the present disclosure may address techniques and mechanisms for a system for exchanging messages between a user of a "business messaging system" (which term will be used herein to refer to messaging systems that may generally provide at least outgoing messaging services from multiple users), a "business user" (which term will be used herein to refer to a user of such a system), and a mobile device. The system may include a business server configured to exchange messages with the business user and to obtain a public identifier for the business user to enable duplex message exchange between the business user and a respective mobile device selected from the mobile devices. The system may also include an application programming interface ("API"), e.g., a short message service ("SMS") API, communicatively coupled to said business server and configured to interact with an SMS system. The SMS system may be run by a SMS server provider that serves the mobile device. The business server may serve a number of business users using a number of public identifiers, where the number of public identifiers may be smaller than the number of business users.

In use, the business user may send a message to a mobile device via the business server using the services provided by the SMS service provider. The message may be received by the business server, which may associate the business user with an identifier of the mobile device and/or a public identifier (e.g., but not limited to, a telephone number), where either the public identifier or a combination of the public identifier and the identifier the mobile device may uniquely identify the business user. The message with the public identifier as a sender may be transmitted to the mobile device. The mobile device may send a reply message to the business user using the public identifier.

According to one aspect of the disclosure, the business server may be configured to categorize the public identifiers and/or the associations of the business user, the mobile device and the public identifier into multiple types. The business server may also be configured to automatically switch to using temporary public identifiers when a predetermined number of fixed public identifiers associated with a respective mobile device is reached.

According to a further aspect of the disclosure, the business server may be configured to identify a business user based upon the public identifier or a combination of the public identifier and the mobile device for sending a reply message to the business user. The business server may be further configured to access a business user directory and/or a database for allowing messages to be sent to business users included in the directory under certain circumstances.

According to a further aspect of the disclosure, the business server may be configured to dissolve associations of a mobile device and to reclaim the public identifiers contained in the associations for another business user to exchange messages with the respective mobile device according to certain criteria. The business server may be further configured to maintain a list of public identifiers for associating with each intended mobile device.

Various aspects of the disclosure may be embodied in the form of hardware, software, firmware, and/or combinations thereof. In the case of software or firmware, a non-transitory machine-readable medium, such as memory (e.g., but not limited to, ROM, RAM, flash, disk, etc.), may be used to store data and/or executable instructions that may be executed by one or more processing devices.

BRIEF DESCRIPTION OF ACCOMPANYING DRAWINGS

Various aspects of this disclosure will now be discussed in further detail in conjunction with the attached drawings, in which.

Figure 1:
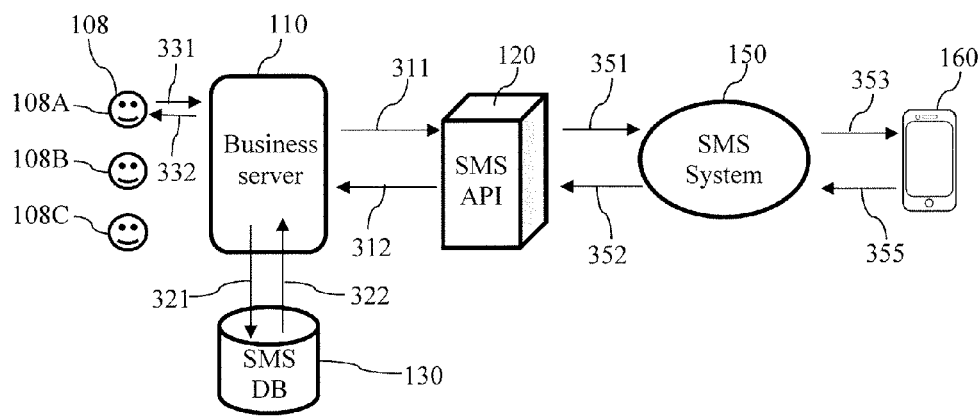
FIG. 1 shows a conceptual diagram of a system for exchanging messages between a short message service ("SMS") user and a mobile device user according to an aspect of this disclosure.

It should be noted that the figures are not drawn to scale and that elements of familiar structures or functions are generally represented by like reference numerals for illustrative purpose throughout the figures. It also should be noted that the figures are only intended to facilitate the description of the various aspects of this disclosure, and therefore, do not illustrate every aspect of this disclosure and do not limit the scope of this disclosure.

DETAILED DESCRIPTION OF ASPECTS OF THE DISCLOSURE

In currently available business messaging systems, a business user may be able to send a message to an intended mobile device, e.g., a cellphone. Such systems, however, may not provide a desired degree of service, e.g., because a reply message sent by a recipient of the message, i.e., a user of the mobile device, may not be routed to the intended business user and, therefore, may not be able to give feedback to the business user or even acknowledge a safe receipt of the message. Because currently-available business messaging systems may lack the ability to route a reply message to the intended business user, a system and method enabling duplex message exchange between the business messaging systems and mobile devices may advantageously provide a basis for enabling duplex communication for exchanging messages between the business users of the business messaging systems and users of SMS services without requiring an individual public identifier for each respective business user. This result may be achieved, according to one aspect of this disclosure, by an example messaging system 100 illustrated in FIG. 1.

Turning to FIG. 1, the messaging system 100 may enable one of multiple business users 108 to exchange messages with a user of one of multiple mobile devices 160, when a limited number of public identifiers are available at a business server 110. The number of the public identifiers may be smaller than the number of the business users 108 that are served by the business server 110. In FIG. 1, the mobile device 160 (or a handheld computing device) may be a cellphone, a tablet computer, a personal digital assistant (PDA), a computer or any other wireless or wired devices that may receive text messages via a wired or wireless communication connection. For purposes of illustration only, exchanging messages between a business user 108 and a user of a mobile device 160 may refer to exchanging message between the business user 108, via a device (not shown), and a user of the mobile device 160. The business user 108 may be a user of the device that may exchange messages with the business server 110, including, but not limited to, a satellite device, a cellphone, a tablet computing device, a computer and the like.

The messaging system 100 may include the business server 110. The business server 110 (or business messaging server) may be a business short messaging service ("SMS") platform including an SMS service for exchanging text messages. The business server 110 may be a single server or a cluster of servers, operated on premise and/or off premise, or be a cloud computing server and the like. Additionally, the business server 110 may exchange messages, via an, an API, e.g., an SMS API 120, with one or more messaging systems or SMS service providers, e.g., an SMS system 150, that may be accessed by the mobile device 160, computers and/or other messaging-capable devices (not shown). The business server 110 may serve a plurality of business users 108, e.g., a user A 108A, a user B 108B and a user C 108C. Each of the plurality of business users 108 may be identified by an internal identifier by the business server 110, e.g., user A 108A may have an identifier 111111, user B 108B may have an identifier 222222, and user C 108C may have an identifier 333333. The internal identifier may not be identifiable by systems other than the business server 110 except when the internal identifier is an assigned public identifier. Additional detail regarding the SMS API 120 and the assigned public identifier will be provided with reference to FIG. 6.

The business server 110 may maintain a user directory and/or a database including all of the business users 108 that are served by the business server 110. The users 108 included in the directory may be assigned with various privileges and/or preferences for receiving different services, e.g., user A 108A may have a privilege of sending and receiving any messages; user B 108B may have a preference of not receiving unsolicited messages; and user C 108C may have a privilege of being assigned a dedicated public identifier. Additional detail regarding the dedicated public identifier will be provided herein.

For purposes of this disclosure, a direct message may be a message sent from a business user 108 and intended for a user of a mobile device 160, and a reply message may be a message sent from the mobile device 160 to the business user 108. When sending a direct message from a business user 108 to a user of a mobile device 160, the business user A 108A may transmit the direct message to the business server 110, at 331. The direct message may include metadata and message text. The metadata of the direct message may include sender identification information and recipient identification information. The sender identification information of the metadata received by the business server 110 may include the internal identifier of the business user 108 (or the device used by the business user 108). The internal identifier, as set forth herein, may be identifiable by the business server 110, but may not be identifiable by other systems, e.g., the SMS system 150, except where the internal identifier is an obtained public identifier. The recipient identification information of the metadata may include an identifier of the mobile device 160 which may be identifiable by the SMS system 150.

The business server 110 may interact with an SMS database ("DB") 130 for obtaining a public identifier that may be used to send the direct message. The SMS DB 130 may be a DB or a database management system ("DBMS"), or alternatively, a directory, a directory service or any type of data repository, for storing a collection of data in an organized manner. The SMS DB 130 may be used to store, e.g., a list of business users 108, a list of public identifiers available to the business users 108, associations of the public identifiers and the mobile device 160 with the business users 108, use logs of the associations and/or the public identifiers, messaging histories and the like.

Upon receiving the direct message, the business server 110 may query, at 321, the SMS database ("DB") 130 for obtaining a public identifier based on the internal identifier of the business user 108 and an identifier of the mobile device 160.

The public identifier may be an identifier that may be uniquely identifiable within certain country, district, network or the like. The public identifiers may be telephone numbers acquired from telephone service providers or from any public number authorities and, therefore, may be identified as an address of the message sender by all of the mobile devices 160 that have access to the SMS system 150.

The business server 110 may maintain the list of public identifiers acquired by, e.g., an operator of the business server 110 and available for the business users 108 in a data repository, e.g., the SMS DB 130 or a directory. Additionally, the business server 110 may also maintain usages of the acquired business identifiers in the data repository, e.g., the SMS DB 130.

The business server 110 may extract the internal identifier of the business user 108 and the identifier of the mobile device 160 from the metadata of the direct message and may obtain the public identifier in a manner according to Table 1, below, which may record the associations of the business users 108 with the public identifiers. For illustrative purpose, records of Table 1 may include the associations that may be created during message exchanges between the business users 108 and the mobile devices 160. In Table 1, the field to be determined may be the public identifier, and the retrieval key may be either the internal identifier of the business user 108 or a composite key consisting of the internal identifier of the business user 108 and the identifier of the mobile device 160. Additional detail regarding the obtaining of the public identifier will be provided with reference to FIG. 10.

TABLE 1

| Composite key | | Field to be determined | Association features | |
| --- | --- | --- | --- | --- |
| Identifier of business user 108 | Phone number of mobile device 160 | Public identifier | Association type | Last-use timestamp |

If there exists an association that contains the internal identifier of the business user 108 and the identifier of the mobile device 160, the public identifier contained in the association may be retrieved, at 322, and used as a sender identifier of the direct message. The association may have been created and recorded for a previous message transfer from the business user 108 to the mobile device 160.

If no such association is found in the SMS DB 130, e.g., there is no association containing the internal identifier of the business user 108 and the identifier of the mobile device 160 in Table 1, a public identifier that is not associated with the mobile device 160 may be selected, and a new association of the business user 108 with the selected public identifier and the mobile device 160 may be created and recorded in the data repository, e.g., Table 1, for future message exchanges. The selected public identifier may be used by the business server 110 to exchange messages between the business user 109 and the user of the mobile device 160.

The business server 110 may set the sender identification information of the metadata of the direct message to include the public identifier. According to some aspects of this disclosure, the association may be a permanent (or fixed) or temporary association among the business user 108, the public identifier and/or the mobile device 160. In the association that associates a combination of the public identifier and the mobile device 160 with the business user 108, the public identifier and the mobile device 160 may be referred to as being associated with each other. In some cases, "associating the combination of the public identifier and the mobile device 160 with the business user 108" may be equivalent to "associating the business user 108 with the public identifier and the mobile device 160". Additionally and/or alternatively, in the association, "associating the business user 108 with the combination of the public identifier and the mobile device 160" may be equivalent to "associating an identifier of the business user 108 with the public identifier and an identifier of the mobile device 160".

At 351, the direct message may be conveyed to the SMS system 150 with the public identifier (as sender) included in the metadata via an SMS API 120. The SMS API 120 may include a set of routines, protocols and/or tools for the business server 110 to interact with the SMS system 150. The SMS API 120 may be installed and run by the business server 110 and/or the SMS system 150.

The SMS system 150 may be a server or SMS service provider for transmitting messages to and/or receiving messages from the mobile devices 160. The SMS system 150 may include, but is not limited to, an internet network, a cellular network operated by the SMS service provider or the like. Although shown and described as separate elements for purposes of illustration only, the SMS DB 130 and/or the SMS API 120 may be integrated with the business server 110 or the SMS system 150 according to some aspects of this disclosure.

Because the mobile device 160 may receive the public identifier as the sender and the identifier of the mobile device 160 as the recipient of the direct message, the mobile device 160 may respond to the business user 108 by sending a reply message to the SMS system 150 using the public identifier as the recipient and the identifier of the mobile device 160 as the sender, at 355. As described herein, the reply message may refer to a message sent by the mobile device 160 to the business user 108 in response to the direct message. The reply message may contain a message text and metadata of the reply message. The metadata may include the identifier of the mobile device 160 as the sender identifier and the public identifier as the recipient identifier of the reply message.

When the reply message is received by the SMS system 150, the reply message including metadata of the reply message may be transferred to the SMS API 120, at 352, which conveys the reply message to the business server 110, at 312. The business server 110 may query the SMS DB 130 with the identifier of the mobile device 160 and the public identifier, at 321, where the identifier of the mobile device 160 may be included in the metadata as the sender and the public identifier may be included in the metadata as the recipient of the reply message. The internal identifier of the business user 108 may be retrieved based on the identifier of the mobile device 160 and the public identifier, at 322, in a manner according to Table 2, below. Because the combination of the identifier of the mobile device 160 and the public identifier may be unique within the messaging system 100, the business server 110 may be enabled to uniquely determine and retrieve the internal identifier of the business user 108 with the composite key consisting of the identifier of the mobile device 160 and the public identifier.

TABLE 2

| Composite key | | Field to be determined | Association feature |
|---|---|---|---|
| Identifier of the mobile device 160 | Public identifier | Identifier of the business user 108 | Last-use timestamp |

Although shown and described as separate tables for purposes of illustration only, the Table 1 and Table 2 may be an integrated data repository, e.g., Table 1 and Table 2 may be two views of the integrated data repository. Therefore, any change to the integrated data repository or to Table 1 or Table 2 may be reflected in both views.

At 332, the reply message may be transferred to business user 108A, if the internal identifier of the business user 108A is retrieved based on the identifier of the mobile device 160 and the public identifier. In general, the business user 108A may be the sender of the direct message to which the reply message corresponds.

With the messaging system 100, a business user 108 may send a direct message via the business server 110 to a selected mobile device 160, and the mobile device 160 may send a reply message back to the sender of the direct message with no ambiguity. Additionally, the business server 110 may require only a limited number of public identifiers to realize the message exchanging functionality of the messaging system 100, saving cost while enabling the unambiguous exchange of the messages; further details of techniques for using a limited number of public identifiers will be discussed below.

Although shown and described as exchanging messages to and/or from the mobile device 160 for purposes of illustration only, any other types of messaging devices may be used for exchanging the messages, including, but not limited to, desk phones and any other wired and wireless devices that may have access to or may be accessed by the SMS system 150. Although shown and described as the SMS messaging system 100 for purposes of illustration only, techniques and solutions disclosed herein may similarly apply to any messaging systems and any business or enterprise communication systems.

Figure 2:
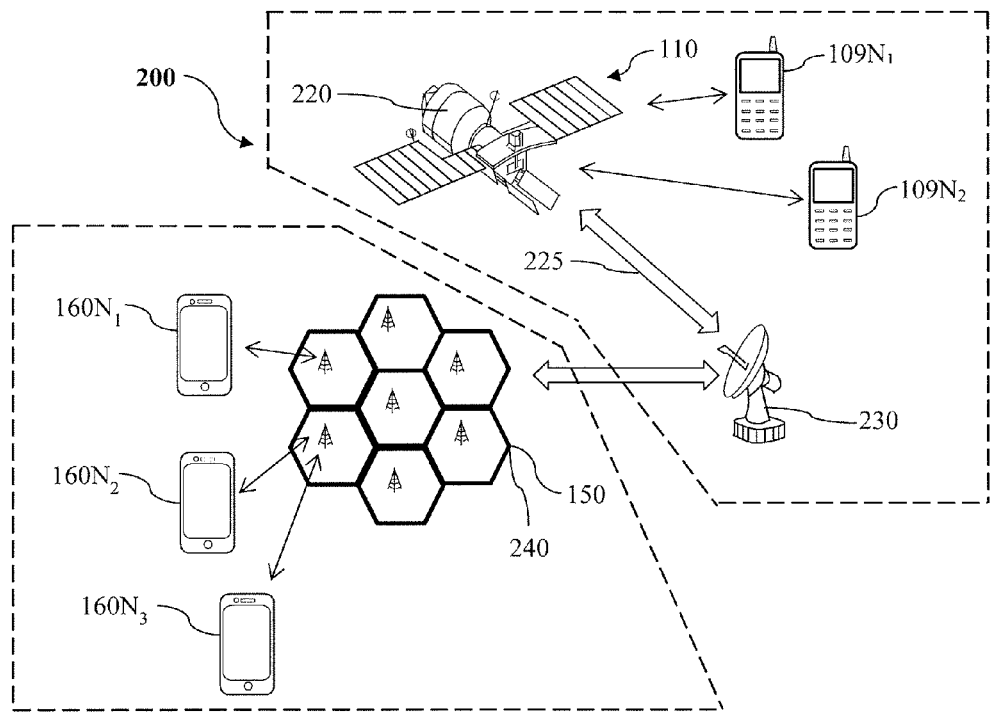
FIG. 2 shows a conceptual schematic diagram of an example of FIG. 1, according to an aspect of this disclosure.

FIG. 2 shows an example of the messaging system 100. Turning to FIG. 2, the business server 110 may be provided as a satellite-based messaging system 200. In FIG. 2, the satellite-based messaging system 200, for example, Higher Ground's SatPaq™ system, may include a plurality of business users 109 (109N₁, 109N₂). The business users 109, for example, a SatPaq™ user, may employ a SatPaq™ attached to or integrated with a mobile phone, a satellite phone or any other devices that may exchange messages via a satellite.

A business user 109, e.g., a first business user 109N₁, may send messages to and/or receive messages from a first mobile device 160N₁, e.g., via a satellite 220. The satellite 220 may be a communications satellite or any satellite or other signal repeating station that may relay and/or amplify text signals. Because satellite 220 can provide services to the areas that may not be served by certain wireless services, e.g., cellular services, the business users 109 may be communicatively connected in remote or isolated areas.

When a direct message is sent by the business user 109 and received by the satellite 220, the direct message may be relayed to a ground station 230. The ground station 230 may include a business server 110 and/or an SMS DB 130 (collectively shown in FIG. 1). As shown and described herein, an operator of the ground station may have acquired a plurality of public identifiers, e.g., phone numbers, and may maintain the public identifiers within the SMS DB 130. The business server 110 may obtain a rented or otherwise acquired public identifier by accessing the SMS DB 130. An association record containing the business user 109, the public identifier and the mobile device 160 may be maintained or created within the SMS DB 130 for logging that the public identifier is associated with the first business user 109N₁ and the first mobile device 160N₁.

The direct message may be transmitted to an SMS system 150 that, e.g., may be a cellular network 240, from the ground station 230 via a SMS API 130 (shown in FIG. 1).

The SMS API 130 may be installed at the ground station 230 and/or at the SMS system 150. The direct message may then be transmitted to the first mobile device 160N₁, which may be a cellphone connected to the cellular network 240. Similarly, the first business user 109N₁ and the other business users, e.g., a second business user 109N₂, may send messages to any of mobile devices 160 that are connected to the SMS system 150.

Upon receiving the direct message, the first mobile device 160N₁ may send a reply message to the business user 109 using the public identifier. Metadata of the reply message may contain the public identifier as a recipient identifier and an identifier of the mobile device 160 as a sender identifier of the reply message. The reply may be relayed via the SMS system 150, e.g., the cellular network 240, and the SMS API 130 to the ground station 230, which may include the business server 110 and the SMS DB 130. The business server 110 may query the SMS DB 130 for an internal identifier of the first business user 109N₁ based on the public identifier or a composite key consisting of an identifier of the first mobile device 160N₁ and the public identifier. As shown and described herein, the internal identifier of the first business user 109N₁ may unambiguously identify the first business user 109N₁, thereby, the reply message may be directed to the first business user 109N₁.

The satellite-based messaging system 200 shown and described herein may be, e.g., a SatPaq™ system that is designed to serve remote and/or isolated areas, such as areas not served by other communication services including, but not limited to, the cellular network 240 or the like. In the solutions shown and described herein, the SatPaq™ system may provide a plurality of SatPaq™ users with messaging services in those areas not served by any cellular networks or wired networks and, thereby, be useful in fields of remote missions, emergency calls, self-survival, field rescue or the like.

Figure 3:
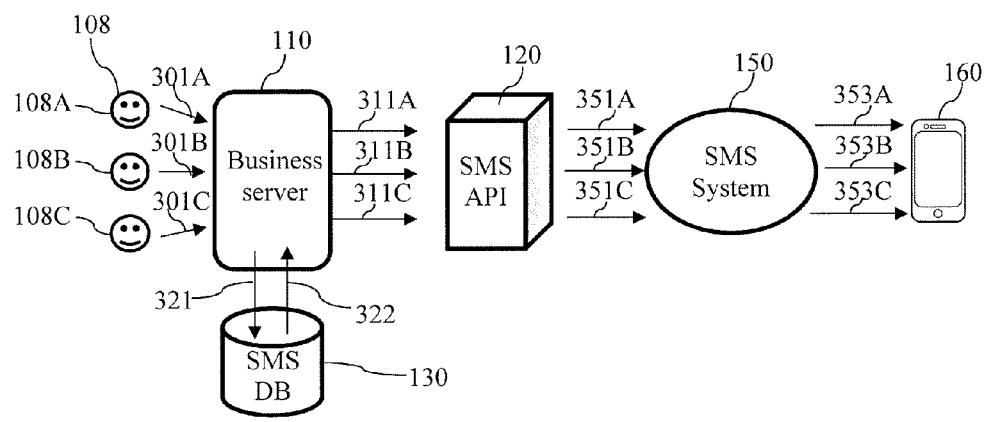
FIGS. 3-8 show conceptual diagrams of various examples of FIG. 1, according to aspects of this disclosure.

FIG. 3 shows another example of the messaging system 100. Turning to FIG. 3, a plurality of business users 108 (108A, 108B and 108C) may send messages to a mobile device 160. In FIG. 3, each of the business users 108 may have an internal identifier, or a business identifier, and may be uniquely identifiable by the internal identifier within the business server 110. The internal identifier may or may not be identifiable outside of the business server 110 and/or a business SMS environment. For example, the business user 108A may have an identifier "user_A"; the business user 108B may have an identifier "user_B"; and the business user 108C may have an identifier "user_C".

A first direct message sent by the business user 108A may be transmitted to a business server 110, at 301A, including a message text and metadata of the first direct message. The metadata may include, but is not limited to, the internal identifier of the business user 108A, which may be "user_A", and an identifier of the mobile device 160. As shown and described with reference to FIG. 1, the business server 110 may query the SMS DB 130, at 321, and obtain a first public identifier, e.g., a phone number, PN_1, at 322. The first public identifier PN_1 may be a public phone number uniquely identifiable within the SMS system 150, which may be acquired by an operator of the business messaging service from an operator of the SMS system 150 or from any other phone number authority.

If an association record containing "user_A" and the identifier of the mobile device 160 exists in the SMS DB 130, the public identifier contained in the association record may be obtained from the SMS DB 130. As shown and described herein, the association may be created and recorded when the business user 108 sends an initial direct message to the mobile device 160. If the association record does not exist, e.g., the business user 108A has not sent a direct message to the mobile device 160, the business server 110 may select a first public identifier, e.g., PN_1, and may associate the first public identifier and the identifier of the mobile device 160 with the business user 108A. When selecting the first public identifier, the business server 110 may search a list of public identifiers stored in the SMS DB 130 for a public identifier that is not associated with the same mobile device 160. A first association record may be created and stored in the SMS DB 130 for logging that the combination of the first public identifier PN_1 and the mobile device 160 is associated with the first business user 108A. The first association may be stored, e.g., in Table 1 and/or Table 2. The first public identifier PN_1 may be logged as associated with the mobile device 160, therefore, the number of public identifiers available for future association with the mobile device 160 may be reduced by one.

The business server 110 may set sender identification information of the metadata of the first direct message to be sent to mobile device 160 to the first public identifier PN_1. The first direct message with the first public identifier as the sender identifier may be transmitted to the SMS system 150 via the SMS API 120, at 311A and 351A. The SMS system 150 may transmit the first direct message to the mobile device 160, at 353A, according to the recipient identification information contained in the metadata of the first direct message. The mobile device 160 may receive the first direct message including the first public identifier PN_1 as the sender identifier and use the first public identifier to reply to the first direct message.

Similarly, a second direct message sent by the business user 108B and destined for the mobile device 160 may be transmitted to the business server 110, at 301B, including a message text and metadata of the second direct message. An internal identifier of the business user 108B may be "user_B". The business server 110 may query the SMS DB 130, at 321, and obtain a second public identifier, e.g., a second phone number PN_2, at 322. If no association record is found, the business server 110 may select a second public identifier, e.g., PN_2, and may associate the second public identifier and the identifier of the mobile device 160 with the business user 108B. When selecting the second public identifier, the business server 110 may query a list of public identifiers stored in the SMS DB 130 for a public identifier that is not associated with the mobile device 160. A second association record may be created and stored in the SMS DB 130 for logging that the combination of the second public identifier PN_2 and the mobile device 160 is associated with the second business user 108B. The second association may be stored, e.g., in Table 1 and/or Table 2.

The business server 110 may set sender identification information of the second direct message to the second direct message with the second public identifier PN_2. The second direct message with the second public identifier as the sender identifier may be transmitted to the SMS system 150 via the SMS API 120, at 311B and 351B. The SMS system 150 may transmit the second direct message to the mobile device 160, at 353B, according to the recipient identification information contained in the metadata of the second direct message. The mobile device 160 may receive the second direct message including the second public identifier PN_2 as the sender identifier and use the second public identifier PN_2 to respond to the second direct message.

A third direct message sent by the business user 108C and destined for the mobile device 160 may be transmitted to the business server 110, at 301C, including a message text and metadata of the third direct message. An internal identifier of the business user 108C may be "user_C". The business server 110 may query the SMS DB 130 at 321, and obtain a third public identifier, e.g., a third phone number PN_3, at 322. If no association record is found, the business server 110 may select a third public identifier, e.g., PN_3, and may associate the third public identifier and the identifier of the mobile device 160 with the business user 108C. When selecting the third public identifier, the business server 110 may query a list of public identifiers stored in the SMS DB 130 for a public identifier that is not associated with the mobile device 160. A third association record may be created and stored in the SMS DB 130 to log that the combination of the third public identifier PN_3 is associated with the third business user 108C. The third association may be stored, e.g., in Table 1 and/or Table 2.

The business server 110 may set sender identification information of the third direct message to the third public identifier PN_3. The third direct message with the third public identifier as the sender identifier may be transmitted to the SMS system 150 via the SMS API 120, at 311C and 351C. The SMS system 150 may transmit the third direct message to the mobile device 160, at 353C, according to the recipient identification information contained in the metadata of the third direct message. The mobile device 160 may receive the third direct message including third public identifier PN_3 as the sender identifier and use third public identifier PN_3 to respond to the third direct message.

Because the each of the business users 108 may be uniquely identified by the metadata of the messages, the mobile device 160 may be enabled to send reply messages to each of the business users 108 that sends a direct message to the mobile device 160.

Figure 4:
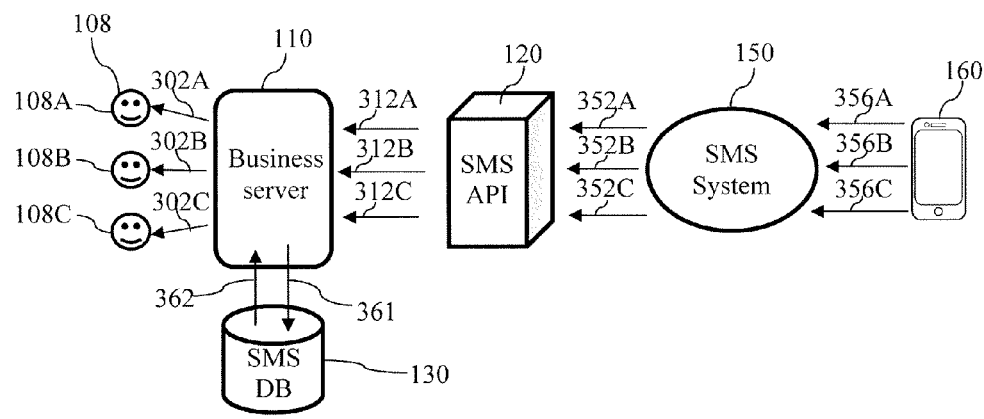

FIG. 4 further illustrates the example of the messaging system 100 of FIG. 3. Turning to FIG. 4, the mobile device 160 may send reply messages to the business users 108 (108A, 108B and 108C) after receiving the messages sent by the business users 108. As shown and described with reference to FIG. 3, the first direct message may be received by the mobile device 160 with a first public identifier PN_1 as a sender identifier. The mobile device 160 may send a first reply message to PN_1 in response to the first direct message.

The first reply message may be transmitted, at 356A, to the SMS system 150, e.g., a cellular network, which may be accessed by a plurality of mobile devices 160 (not shown). At 352A, the SMS system 150 may transmit the first reply message to the SMS API 120 that may convey the first reply message to the business server 110, at 312A. The business server 110 may query the SMS DB 130, at 361, based on a first composite key consisting of the identifier of the mobile device 160 and the first public identifier PN_1. Because the combination of the first public identifier PN_1 and the identifier of the mobile device 160 is unique, an internal identifier of the first business user 108A, which is associated with the combination, may be determined and retrieved unambiguously according to the first composite key, at 362.

Thus, the business server 110 may route the first reply message, at 302A, to the first business user 108A that may be the sender of the first direct message.

Similarly, the mobile device 160 may send a second reply message to the second business user 108B via the SMS system 150, the SMS API 120 and the business server 110, and send a third reply message to the third business user 108C via the SMS system 150, the SMS API 120 and the business server 110. The second business user 108B may be determined and retrieved unambiguously according to the combination of the second public identifier and the identifier of the mobile device 160; and the third business user 108C may be determined and retrieved unambiguously according to the combination of the third public identifier and the identifier of the mobile device 160.

Figure 5:
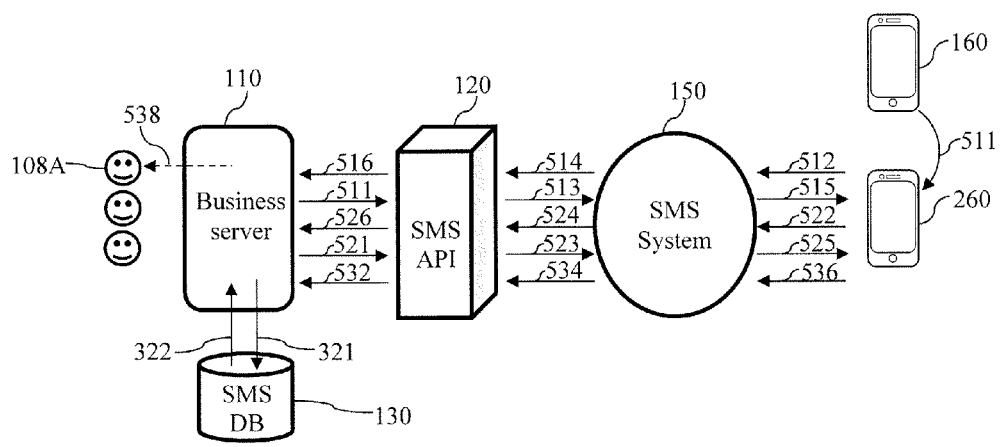

FIG. 5 shows another example of the messaging system 100. Turning to FIG. 5, a second mobile device 260 may send a message to a business user 108 using a public identifier obtained from a first mobile device 160. In FIG. 5, the first mobile device 160 may have received a message from a business user 108, e.g., a first business user 108A, and therefore, may have the public identifier PN_1 that is associated with the first mobile device 160 and the business user 108.

The second mobile device 260 may obtain the public identifier PN_1 from the first mobile device 160, at 511, and send the message using the public identifier as a recipient of the message, at 512. The message may be received by an SMS system 150, at 512, and conveyed to a business server 110 via an SMS API 120, at 514 and 516. The business server 110 may, at 321, query a SMS DB 130 based on a composite key consisting of the public identifier PN_1 and the identifier of the second mobile device 260, e.g., a phone number of the second mobile device 260. Assuming that the business user 108A or any other business user 108 has not sent a direct message to the second mobile device 260 and that, therefore, an association containing the second mobile device 260 and the public identifier PN_1 has not been recorded in a previous communication, the business server 110 may not be able to determine an internal identifier according to the composite key, at 322.

Finding no record corresponding to the public identifier and the second mobile device 260, the business server 110 may send a query message, at 511, via the SMS API 120, at 513 and the SMS system 150, at 515, to a user of the second mobile device 260. The query message may ask for additional information regarding the business user 108, including, but not limited to, a name of the business user 108, a phone number, another alphanumerical identifier of the business user 108 or the identifier of the first mobile device 160 from which the second mobile device 260 obtained the public identifier PN_1. For example, the message may say "System: business user not found, please provide the intended recipient user_ID."

The user of the second mobile device 260 may reply to the query message, at 522, via the SMS system 150 with answer(s) for further identifying the intended business user 108. For example, the answer message may say "Reply to System: the internal identifier of the business user is 'user_A'" or alternatively "'user_A'". The business server 110 may receive the answer(s), at 526, via the SMS API 120, at 524. The business server 110 may further query, at 321, the SMS DB 130 for the internal identifier of the business user 108A. If the business user 108A is found based on the answer(s), the business server 110 may associate, at 322, a second public identifier that is not associated with the second mobile device 260, e.g., PN_2, with the second mobile device 260 and the business user 108A. A further message with the second public identifier PN_2 may be sent to the second mobile device 260 from the business server 110, at 521, 523 and 525, with the second public identifier PN_2 being a sender identifier and the second mobile device 260 being a recipient of the further message. In the further message, the user of the second mobile device 260 may be informed that the second public identifier may be used for further message exchange with the business user 108A. For example, the further message may say "System: please use PN_2 to exchange messages with the business user 108A."

However, if the business user 108 is not found by the query, at 321, an alternative message may be sent to the second mobile device 260, informing the user of the second mobile device 260 that no business user 108 has been found and/or asking the second mobile device 260 to take further actions, or notifying the user of the second mobile device 260 that the message cannot be delivered to an intended business user 108.

Although shown and described as being obtained from the first mobile device 160 for purposes of illustration only, the public identifier may be obtained from any other suitable source, e.g., a website, a message from another source and/or a conversation. Alternatively and/or additionally, when the business server 110 receives the message, at 516, and fails to determine to whom the message is intended the business server 110 may send a notice message to the second mobile device 260 to inform that the message cannot be delivered. For example, the message may say "System: your message could not be delivered."

According to some aspects of this disclosure, public identifiers may be categorized into various types based upon business requirements, total number and/or privileges of the business users 108, total number and/or usages of the public identifiers, and/or the number of mobile devices 160 that wish to exchanging messages with the business users 108. Accordingly, associations containing the categorized public identifiers may be categorized into various types respectively.

According to some further aspects of this disclosure, the public identifiers may be categorized into three types, type-1, type-2 and type-3. Accordingly, associations containing type-1 public identifiers may be categorized as type-1 associations; associations containing type-2 public identifiers may be categorized as type-2 associations; and associations containing type-3 public identifiers may be categorized as type-3 associations. In a type-1 association, once established, the association between a business user 108 and a combination of a public identifier and a mobile device 160 may be fixed. In other words, a type-1 association may not be dissolved, and the public identifier contained in the type-1 association may not generally be reclaimed for further use with the mobile device 160 once the association is established. In a type-2 association, the association between a business user 108 and a combination of a public identifier and a mobile device 160 may not be fixed. In other words, the type-2 association may be dissolved, and the public identifier contained in the type-2 association may be reclaimed for further use with the mobile device 160 based on dynamic needs, e.g., when all of the type-2 public identifiers are associated with the mobile device 160, so the public identifier may be made available for another business user 108 to exchange messages with the mobile device 160. In a type-3 association, a unique public identifier (type-3 identifier) may be permanently assigned to a business user 108. The type-3 association is illustrated below, in conjunction with FIG. 6.

Figure 6:
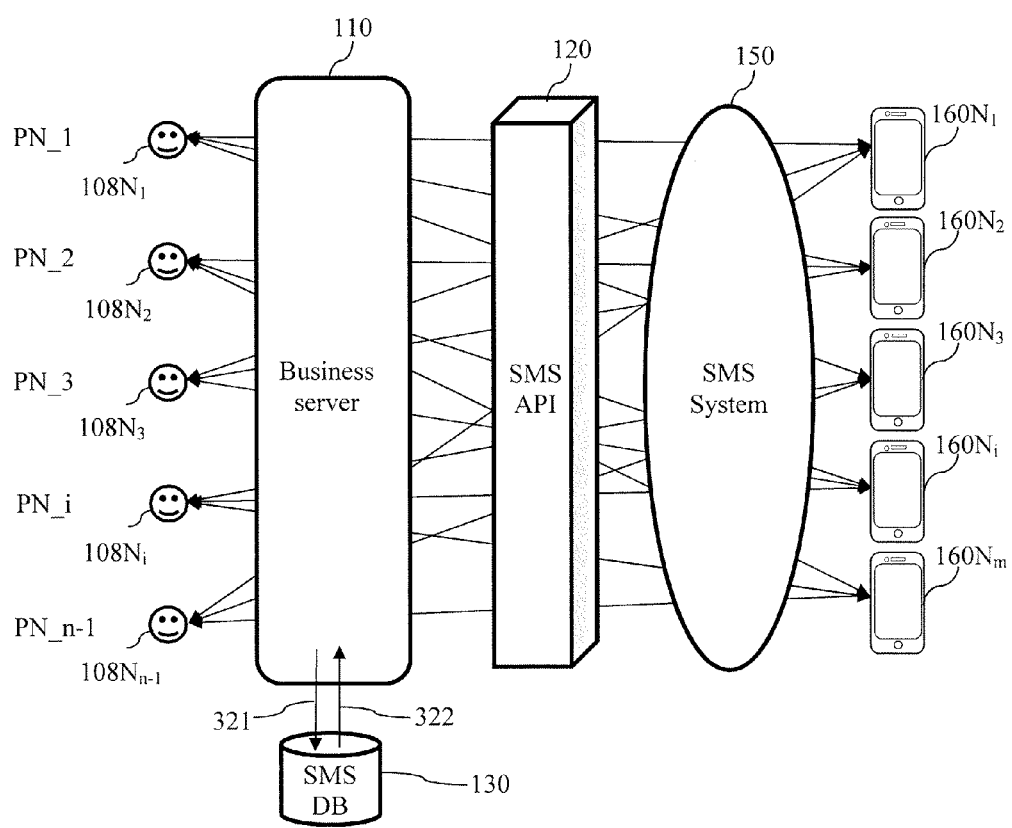

FIG. 6 shows an example of the messaging system 100. Turning to FIG. 6, a type-3 association is illustrated with each of a plurality of business users 108 being assigned a dedicated public identifier. In FIG. 6, the messaging system 100 may have n type-3 public identifiers, e.g., public phone numbers PN_1 to PN_n. PN_1 to PN_n−1 of the n public identifiers may be assigned to n−1 of the business users $108N_1$-$108N_{n-1}$, and a last public identifier PN_n may be assigned to the messaging system 100 as a generic public identifier of a business server 110.

A business user 108, e.g., a first business user $108N_1$, may use its assigned public identifier, e.g., PN_1, to send messages to multiple (unlimited number of) mobile devices 160, e.g., mobile devices $160N_1$-$160N_3$. When a specific mobile device 160 of the multiple mobile devices, $160N_1$-$160N_3$, sends a reply message to a direct message sent from the first business user $108N_1$, the first business user $108N_1$ may be determined unambiguously via the first public identifier PN_1.

Because any business user 108 may be determined with an associated public identifier, the type-3 association may be an association of the public identifier with the business user 108. Any mobile device 160 may send messages to the business user 108 with a type-3 association even if the mobile device 160 has not received a direct message from the business user 108. As described herein, type-3 association may be simple and convenient but costly; therefore, only privileged business users 108 (e.g., those willing to pay for such privileges) may be assigned with type-3 associations. Accordingly, the business users 108 assigned with the type-3 associations may be referred to as type-3 users.

According to some aspects of this disclosure, business users 108 that are not assigned with a dedicated public identifier, for example, a business user $108N_n$ (not shown) and further business users 108 (collectively not shown), may use the generic public identifier to send a direct message and/or receive a reply message. In some cases, when a business user 108 sends a direct message using the generic public identifier, the message text of the direct message may be prefixed and/or suffixed, e.g., by the business server 110.

For example, if the business user $108N_n$ is "Michael Smith" who is, e.g., a SatPaq™ user, the direct message may be sent with a prefix and/or a suffix via the generic public identifier. A direct message "Having great time on the trail" from the business user $108N_n$ to a mobile device 160 may be prefixed and/or suffixed. For example, the direct message may become "SatPaq™—message from Michael Smith: 'Having great time on the trail'. To reply start message with 'Reply to Michael Smith:'". When the intended mobile device 160 receives the prefixed and/or suffixed message from the generic identifier, the user of the mobile device 160 may reply to the generic public identifier PN_n with a message by prefixing the message text of the reply message, e.g., "Reply to Michael Smith: 'Have fun'". The business server 110 may forward the reply message to the intended recipient Michael Smith, if "Michael Smith" is found as a SatPaq™ user. Similarly, the direct message and/or the reply message may include added suffixes to identify the business user $108N_n$. The language used in the prefixes and suffixes above are for illustration only, and any other suitable language may be used as the prefixes and/or the suffixes.

It is also noted that the use of such a generic public identifier, along with prefixes and/or suffixes, may be used in combination with the other techniques disclosed herein, according to various aspects of this disclosure.

In accordance with another aspect of this disclosure, the business server 110 may identify that a message from the device mobile 260 may be an unsolicited message and, therefore, may block the message. The business server 110 may alert the sender, e.g., the user of the mobile device 260, that the message cannot be delivered, thereby, providing a security measure for blocking unsolicited messages.

Figure 7:
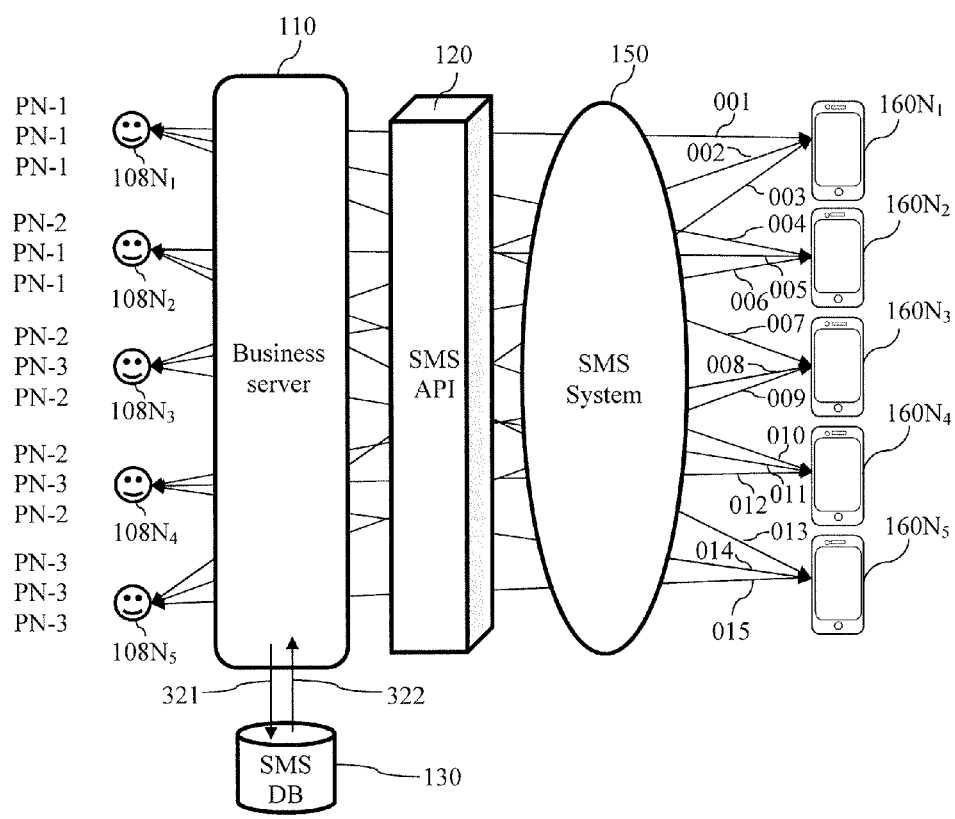

FIG. 7 shows a further example of the messaging system 100. Turning to FIG. 7, a type-1 association is illustrated with each of a plurality of business users 108 being associated with a limited number of mobile devices 160. In FIG. 7, each of the mobile devices 160 may have a limited number of associations with the business users 108, e.g., three associations, with a limited number of business users 108 and respective public identifiers. The associations described herein may be recorded in a data repository within an SMS DB 130, e.g., as association entries in Table 1 and/or Table 2 with reference to FIG. 1. In other words, a business user 108 may be associated with a mobile device 160 and a public identifier when an association entry is recorded within the data repository. Each of the business users 108 may be determined based on a public identifier and an identifier of a mobile device 160 of an association.

As shown in FIG. 7, the business server 110 may serve a number of business users 108, e.g., five business users $108N_1$-$108N_5$. A first business user $108N_1$ may be associated with combinations of a first public identifier PN-1 and a first mobile device $160N_1$, the first public identifier PN-1 and a second mobile device $160N_2$, and the first public identifier and a third mobile device $160N_3$. A second business user $108N_2$ may be associated with combinations of a second public identifier PN-2 and the second mobile device $160N_2$, the first public identifier, PN-1 and a fourth mobile device $160N_4$, and the first public identifier PN-1 and a fifth mobile device $160N_5$, respectively. A third business user $108N_3$ may be associated with combinations of the second public identifier PN-2 and the first mobile device $160N_1$, a third public identifier PN-3 and the second mobile device $160N_2$, the second public identifier PN-2 and the fourth mobile device $160N_4$, respectively. A fourth business user $108N_4$ may be associated with combinations of the second public identifier PN-2 and the third mobile device $160N_3$, the third public identifier PN-3 and the fourth mobile device $160N_4$, and the second public identifier PN-2 and the fifth mobile device $160N_5$, respectively. A fifth business user $108N_5$ may be associated with combinations of the third public identifier PN-3 and the first mobile device $160N_1$, the third public identifier PN-3 and the third mobile device $160N_3$, and the third public identifier PN-3 and the fifth mobile device $160N_5$.

An association chart for facilitating future two-directional communications (direct messages and reply messages), including routing, may be shown as Table 3:

TABLE 3

| Association number | Associated business user | Mobile device | Public identifier | Association type | Last used time-stamp |
|---|---|---|---|---|---|
| 001 | $108N_1$ | $160N_1$ | PN-1 | 1 | |
| 004 | $108N_1$ | $160N_2$ | PN-1 | 1 | |
| 007 | $108N_1$ | $160N_3$ | PN-1 | 1 | |
| 005 | $108N_2$ | $160N_2$ | PN-2 | 1 | |
| 010 | $108N_2$ | $160N_4$ | PN-1 | 1 | |
| 013 | $108N_2$ | $160N_5$ | PN-1 | 1 | |
| 002 | $108N_3$ | $160N_1$ | PN-2 | 1 | |
| 006 | $108N_3$ | $160N_2$ | PN-3 | 1 | |
| 011 | $108N_3$ | $160N_4$ | PN-2 | 1 | |
| 008 | $108N_4$ | $160N_3$ | PN-2 | 1 | |
| 012 | $108N_4$ | $160N_4$ | PN-3 | 1 | |
| 014 | $108N_4$ | $160N_5$ | PN-2 | 1 | |
| 003 | $108N_5$ | $160N_1$ | PN-3 | 1 | |
| 009 | $108N_5$ | $160N_3$ | PN-3 | 1 | |
| 015 | $108N_5$ | $160N_5$ | PN-3 | 1 | |

Note that the "Association number" and "Last used time-stamp" fields are shown here and in Table 4, below, but are not needed in the context of the present discussion; these will be used, however, in subsequent discussion and tables below.

Accordingly, Table 4 for determining a business user 108 may be generated based on the Table 3. When one of the mobile devices 160 sends a reply message to one of the business users 108 using a respective public identifier, a unique business user 108 may be determined based on the mobile device 160 and the public identifier.

TABLE 4

| Association number | Mobile device | Public identifier | Associated business user | Association type | Last used time-stamp |
|---|---|---|---|---|---|
| 001 | $160N_1$ | PN-1 | $108N_1$ | 1 | |
| 002 | $160N_1$ | PN-2 | $108N_3$ | 1 | |
| 003 | $160N_1$ | PN-3 | $108N_5$ | 1 | |
| 004 | $160N_2$ | PN-1 | $108N_1$ | 1 | |
| 005 | $160N_2$ | PN-2 | $108N_2$ | 1 | |
| 006 | $160N_2$ | PN-3 | $108N_3$ | 1 | |
| 007 | $160N_3$ | PN-1 | $108N_1$ | 1 | |
| 008 | $160N_3$ | PN-2 | $108N_4$ | 1 | |
| 009 | $160N_3$ | PN-3 | $108N_5$ | 1 | |
| 010 | $160N_4$ | PN-1 | $108N_2$ | 1 | |
| 011 | $160N_4$ | PN-2 | $108N_3$ | 1 | |
| 012 | $160N_4$ | PN-3 | $108N_4$ | 1 | |
| 013 | $160N_5$ | PN-1 | $108N_2$ | 1 | |
| 014 | $160N_5$ | PN-2 | $108N_4$ | 1 | |
| 015 | $160N_5$ | PN-3 | $108N_5$ | 1 | |

According to Table 4, for example, if the first mobile device $160N_1$ sends a message to PN-1, PN-2 or PN-3, the message may be directed to the first business user $108N_1$, the third business user $108N_3$ or the fifth SMS $108N_5$ respectively. Messages sent to each public identifier from a mobile device 160 may be unambiguously directed to a respective business user 108 according to the public identifier and the mobile device 160. Similarly, if the second mobile device $160N_2$ sends a message to PN-1, PN-2 or PN-3, the message may be directed to the first business user $108N_1$, the second business user $108N_2$ or the third business user $108N_3$ respectively. If the third mobile device $160N_3$ sends a message to PN-1, PN-2 or PN-3, the message may be directed to the first business user $108N_1$, the fourth business user $108N_4$ or the fifth business user $108N_5$ respectively. If the fourth mobile device $160N_4$ sends a message to PN-1, PN-2 or PN-3, the message may be directed to the second business user $108N_2$, the third business user $108N_3$ or the fourth business user $108N_4$ respectively. If the fifth mobile device $160N_5$ sends a message to PN-1, PN-2 or PN-3, the message may be directed to the second business user $108N_2$, the fourth business user $108N_4$ or the fifth business user $108N_5$ respectively. According to Table 4, there may be no ambiguity by any combination of a mobile device 160 and a public identifier.

With type-1 associations, a business user 108 may send direct messages to an unlimited number of mobile devices 160; a mobile device 160 may reply to the business user 108 when a direct message is received from the business user 108 or when the mobile device 160 obtains the public identifier contained in the type-3 association from some other source. A type-1 association may be permanent and may not be dissolved automatically unless the type-1 association is reconfigured into a type-2 association, e.g., by an administrator of the business server 110 and/or the SMS DB 130.

With type-2 associations, to ensure that a user of each mobile device 160 may unambiguously reply to a direct message received from a business user 108, the number of public identifiers required may depend on a largest number of business-users associated with any mobile device. Because in a large business messaging system, this largest number may be much smaller than the total number of business-users in the messaging system, an approach in accordance with this disclosure may utilize fewer public numbers than the number of business-users. Accordingly, compared with the approach of type-1 associations, costs with type-2 associations may be reduced; and compared with the approach of type-3 associations, costs with type-1 or type-2 associations may be greatly reduced.

The number of acquired public identifiers that may be used for establishing type-2 associations may be determined by a number of business users 108 that a specific mobile device 160 may exchange messages with, e.g., a largest number of business users 108 that any mobile device 160 may need to be associated with. This largest number may be obtained or estimated based on a data repository for recording the associations, e.g., Table 3 and/or Table 4. According to some aspects of this disclosure, the business server 110 may monitor and/or track the number of public identifiers associated with respective mobile devices 160 and dynamically collect statistical data from the data repository. The largest number of associations for any mobile device 160 may be determined based on the number of association entries of a mobile device 160 with the most association entries in the data repository. According to some other aspects of this disclosure, when the largest number of associations is greater than a predetermined threshold, additional type-1 public identifiers may be acquired.

Although shown and described as having five business users 108 and five mobile devices 160 for purposes of illustration only, any number of business users 108 and/or mobile devices 160 may be associated with a suitable number of public identifiers. In a typical system in accordance to this disclosure, the business server 110 may serve tens of thousands of business users 108, or even millions of business users 108. The number of associations, between any business user 108 and a community of mobile devices 160, being supported by a typical system may be much smaller than the number of business users 108 served by the system; therefore, the costs according to this disclosure may be reduced.

Although the manner shown and described in FIG. 7 may improve usage of the acquired public identifiers, thereby, saving costs, there may be some associations that may not be used efficiently. As an example, associations 010, 011 and 015 may not have been used for a certain time duration, e.g., times during which the associations 010, 011 and 015 have not been used may exceed a predetermined duration threshold. If, for example, the first business user 108N$_1$ sends messages to the fourth mobile device 160N$_4$ and the fifth mobile device 160N$_5$, public identifiers may be needed for associating in conjunction with these new transmissions. According to some aspects of this disclosure, type-2 public identifiers may be made available to the business users 108 for sending messages to the mobile devices 160.

As shown and described herein, type-2 associations may be temporary associations and, therefore, may be dissolved when a certain condition is met (or when multiple conditions are met). Additional detail regarding the dissolving of associations will be provided with reference to FIGS. 8 and 11. A public identifier of the dissolved association may be reclaimed for another business user 108 to exchange messages with the mobile device 160 contained in the dissolved association (or with another mobile device 160 not already associated with that public identifier and not yet associated with the business user 108).

Figure 8:
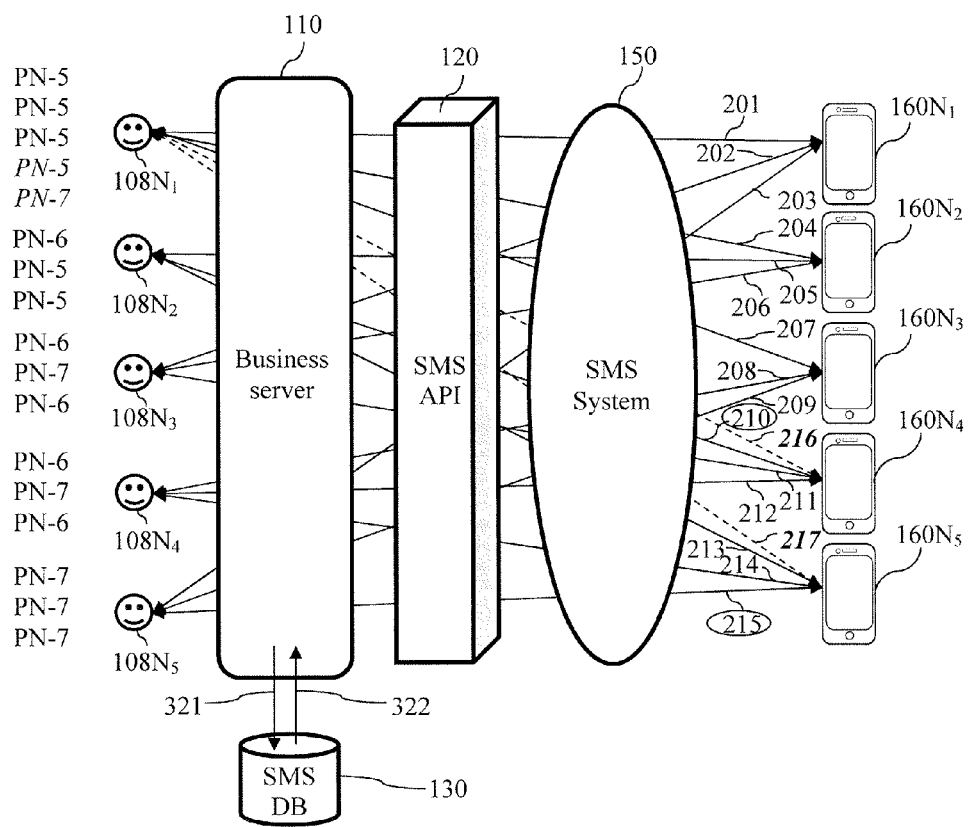

FIG. 8 shows another example of the messaging system 100. Turning to FIG. 8, type-2 associations may be dissolved, and public identifiers contained in the dissolved associations may be reclaimed. As shown in FIG. 8, business users 108N$_1$-108N$_5$ may be associated with mobile devices 160N$_1$-160N$_5$ and public identifiers PN-5-PN-7 as shown in Table 5. The public identifiers PN-5-PN-7 may be type-2 public identifiers and, therefore, the associations 201-215 containing the public identifiers PN-5-PN-7 may be type-2 associations.

In Table 5 below, each mobile device 160 may be associated with all three public identifiers. However, associations 210 and 215, for example, may have not been used for long durations of time. When a business user 108 sends a message to an intended mobile device 160 with which the business user 108 is not associated, e.g., business user 108A sends a message to a user of a mobile device 160N$_4$, a business server 110 may select a type-2 association of the intended mobile device 160N$_4$ with the oldest last-used timestamp entry from a data repository for storing the association records, e.g., an association 210 in Table 5. The selected association may be dissolved by deleting the association record from the data repository, including Table 5.

The public identifier PN-5 contained in the dissolved association may be reclaimed for another business user 108 to associate with the mobile device 160, e.g., the business user 108N$_1$ to associate with the mobile device 160N$_4$. For example, the business server 110 may associate an internal identifier of the business user 108N$_1$ with an identifier the mobile device 160N$_4$ and the reclaimed public identifier PN-5. A corresponding association 216 may be created and recorded in the data repository, e.g., Table 5. Alternatively, the association number 210 may be recycled and by used to identify the new association between the business user 108N$_1$ and the mobile device 160N$_4$.

Similarly, when the business user 108N$_1$ sends a direct message to mobile device 160N$_5$, the business server 110 may select a type-2 association of the mobile device 160N$_5$ with an oldest last-used time from the data repository, e.g., an association 215 in Table 5. The selected association may be dissolved by deleting the respective association record from the data repository, e.g., an SMS DB 130, including Table 5.

The public identifier PN-7 contained in the dissolved association may be reclaimed for the business user 108N$_1$ to associate with the mobile device 160N$_5$. The business server 110 may associate an internal identifier of the business user 108N$_1$ with an identifier of the mobile device 160N$_5$ and the reclaimed public identifier PN-5. A corresponding association 217 may be created and recorded in the data repository, e.g., Table 5. Alternatively, the association number 215 may be recycled and by used to identify the new association between the business user 108N$_1$ and the mobile device 160N$_5$.

The Table 5 may become Table 5A below after dissolving the selected associations and the recording the new associations.

A practice example of the above-mentioned scenarios may be when the business user 108N$_1$ broadcasts a message to mobile devices 160N$_1$-160N$_5$ when the business user 108N$_1$ has been only associated with mobile devices 160N$_1$-160N$_3$. In such a case, the business server 110 may dissolve the associations 210 and 215, and may associate the business user $108N_1$ with $160N_4$ and $160N_5$ and the public identifiers contained in the dissolved associations in a manner shown and described above.

TABLE 5

| Association No. | Mobile device | Public identifier | Associated business user | Association type | Last used YYYY-MM-DD HH:MM:SS |
|---|---|---|---|---|---|
| 201 | $160N_1$ | PN-5 | $108N_1$ | 2 | 2017-01-05 10:36:08 |
| 202 | $160N_1$ | PN-6 | $108N_3$ | 2 | 2017-01-09 11:10:08 |
| 203 | $160N_1$ | PN-7 | $108N_5$ | 2 | 2017-01-10 17:10:08 |
| 204 | $160N_2$ | PN-5 | $108N_1$ | 2 | 2017-01-08 18:10:08 |
| 205 | $160N_2$ | PN-6 | $108N_2$ | 2 | 2017-01-03 09:10:08 |
| 206 | $160N_2$ | PN-7 | $108N_3$ | 2 | 2017-01-02 10:10:08 |
| 207 | $160N_3$ | PN-5 | $108N_1$ | 2 | 2017-01-01 18:10:08 |
| 208 | $160N_3$ | PN-6 | $108N_4$ | 2 | 2017-01-07 19:10:08 |
| 209 | $160N_3$ | PN-7 | $108N_5$ | 2 | 2017-01-08 11:10:08 |
| 210 | $160N_4$ | PN-5 | $108N_2$ | 2 | 2016-12-08 11:28:08 |
| 211 | $160N_4$ | PN-6 | $108N_3$ | 2 | 2017-01-10 10:28:08 |
| 212 | $160N_4$ | PN-7 | $108N_4$ | 2 | 2017-01-09 10:10:08 |
| 213 | $160N_5$ | PN-5 | $108N_2$ | 2 | 2017-01-10 10:10:08 |
| 214 | $160N_5$ | PN-6 | $108N_4$ | 2 | 2017-01-08 10:10:08 |
| 215 | $160N_5$ | PN-7 | $108N_5$ | 2 | 2016-12-09 11:28:08 |

Accordingly, when the first business user $108N_1$ sends a direct message to the fourth mobile device $160N_4$, the fourth mobile device $160N_4$ may receive metadata of the direct message, including the public identifier PN-5 as sender of the direct message. When the fourth mobile device $160N_4$ sends a reply message using the public identifier PN-5, the business server 110 may determine the internal identifier of the first business user $108N_1$ based on the public identifier PN-5 and the identifier of the fourth mobile device $160\ N_4$. Therefore, the reply message may be directed to the first business user $108N_1$. Similarly, when the first business user $108N_1$ sends a direct message to the fifth mobile device $160N_5$, the fifth mobile device $160N_5$ may receive metadata of the direct message including the public identifier PN-7 as sender of the direct message. Accordingly, when the fifth mobile device $160N_5$ sends a reply message using the public identifier PN-7, the business server 110 may determine the internal identifier of the first business user $108N_1$ based on the public identifier PN-7 and the identifier of the fifth mobile device $160N_5$. Therefore, the reply message may be directed to the first business user $108N_1$ unambiguously.

TABLE 5A

| Association No | Mobile device | Public identifier | Associated business user | Association type | Last used |
|---|---|---|---|---|---|
| 201 | $160N_1$ | PN-5 | $108N_1$ | 2 | 2017-01-05 10:36:08 |
| 202 | $160N_1$ | PN-6 | $108N_3$ | 2 | 2017-01-09 11:10:08 |
| 203 | $160N_1$ | PN-7 | $108N_5$ | 2 | 2017-01-10 17:10:08 |
| 204 | $160N_2$ | PN-5 | $108N_1$ | 2 | 2017-01-08 18:10:08 |
| 205 | $160N_2$ | PN-6 | $108N_2$ | 2 | 2017-01-03 09:10:08 |
| 206 | $160N_2$ | PN-7 | $108N_3$ | 2 | 2017-01-02 10:10:08 |
| 207 | $160N_3$ | PN-5 | $108N_1$ | 2 | 2017-01-01 18:10:08 |
| 208 | $160N_3$ | PN-6 | $108N_4$ | 2 | 2017-01-07 19:10:08 |
| 209 | $160N_3$ | PN-7 | $108N_5$ | 2 | 2017-01-08 11:10:08 |
| 216 | $160N_4$ | PN-5 | $108N_1$ | 2 | 2017-01-11 10:28:08 |
| 211 | $160N_4$ | PN-6 | $108N_3$ | 2 | 2017-01-10 12:28:08 |
| 212 | $160N_4$ | PN-7 | $108N_4$ | 2 | 2017-01-09 14:10:08 |
| 213 | $160N_5$ | PN-5 | $108N_2$ | 2 | 2017-01-10 19:10:08 |
| 214 | $160N_5$ | PN-6 | $108N_4$ | 2 | 2017-01-08 10:10:08 |
| 217 | $160N_5$ | PN-7 | $108N_1$ | 2 | 2017-01-11 11:28:08 |

According to some other aspects of this disclosure, the number of available public identifiers, e.g., unused public identifiers, for each mobile device 160 may be maintained according to a predetermined threshold. The predetermined threshold may be a percentage of all type-2 public identifiers, e.g., eighty percent of all type-2 public identifiers, or an absolute number, e.g., ten available public identifiers, e.g., unused public identifiers. When a level of the available combinations falls below the predetermined threshold for a specific mobile device 160, the business server 110 may identify one or more selected associations as dissolvable. According to some aspects of this disclosure, a selected dissolvable association may be marked with a flag field in the data repository, e.g., with a "dissolvable flag" column (not shown) in Tables 1-5. The selected associations may have not been used for the longest durations or for a predetermined duration. Associations identified as dissolvable may be dissolved when another business user 108 sends a direct message to the specific mobile device 160 and requires a public number to establish a new association. However, if an association marked as dissolvable is used before the association is dissolved, the dissolvable mark of the association may be removed.

Figure 9:
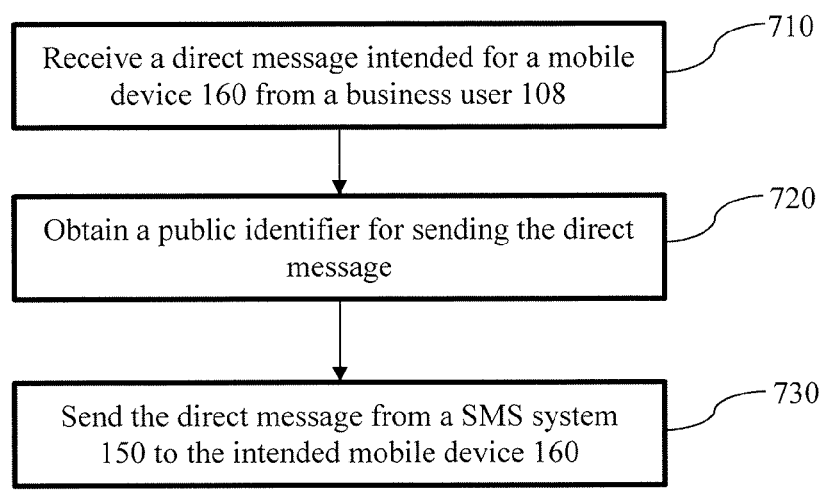
FIG. 9 shows a top-level conceptual block diagram of a example process that may be performed in the examples of FIGS. 1-6, according to an aspect of this disclosure.

FIG. 9 shows an example method 700 for exchanging messages between a business user 108 and a mobile device 160. Turning to FIG. 9, a direct message may be received, at 710. The direct message may be sent from a business user 108 and intended for a specific mobile device 160 as a recipient of the message. The direct message may be received, e.g., by a business server 110 (shown in FIG. 1) that may serve a number of business users 108. The direct message may include a message text and metadata of the message text. The metadata may include, but is not limited to, sender identification information and recipient identification information. The sender identification information received, at 710, may include an internal identifier of the business user 108, which may be identifiable by the business server 110, but may or may not be identifiable outside of the business server 110.

When the direct message is received, a public identifier may be obtained, at 720, for sending the direct message from the business user 108 to the selected mobile device 160. The public identifier may be obtained by either retrieving the public identifier from an association containing the business user 108 and the selected mobile device 160 or by associating the business user 108 with a public identifier based on the business user 108 or the intended mobile device 160, or based on the business user 108 and the intended mobile device 160 depending on whether such public identifier is, e.g., unused. The metadata of the direct message may be set to include the associated public identifier as a sender and the selected mobile device 160 as a recipient of the direct message.

At 730, the direct message may be transmitted to the intended mobile device 160 via an SMS system 150. The public identifier and the recipient identification information included in the metadata of the first message may be transmitted to the recipient and may subsequently be used to send a reply message from the selected mobile device 160 to the business user 108.

Figure 10:
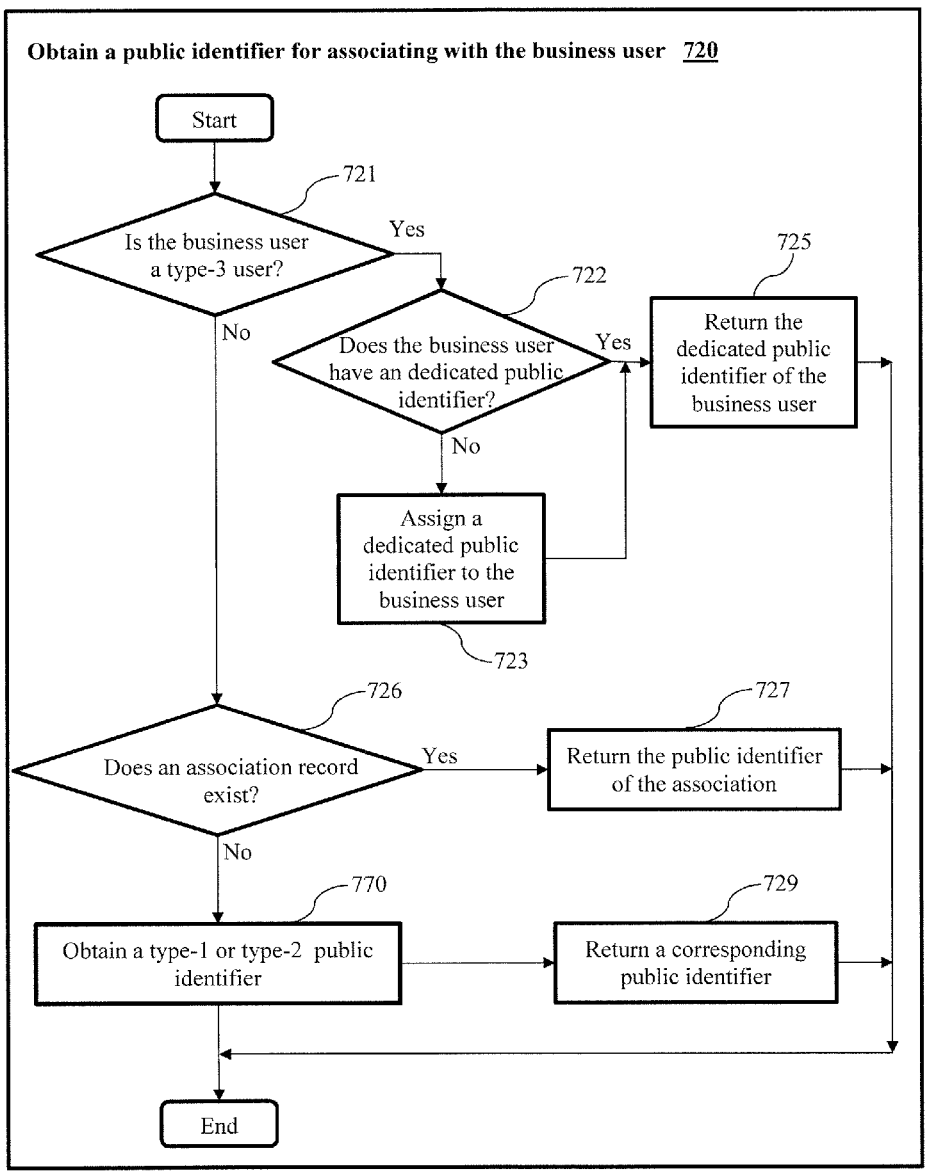
FIGS. 10-12 show conceptual flowcharts of various examples of FIG. 8, according to aspects of this disclosure.

FIG. 10 shows an example of a sub-process of the method 700 of FIG. 9. Turning to FIG. 10, an example process of step 720 of the method 700 is further articulated, i.e., a public identifier may be obtained for associating the mobile device 160 with the business user 108. In FIG. 10, whether the business user 108 is a type-3 user may be assessed, at 721. The business user 108 may be assessed, e.g., by querying the SMS DB 130 (shown in FIG. 1) based on an identifier of the business user 108, e.g., the internal identifier of the business user 108.

If the business user 108 is a type-3 user, whether the business user 108 has an assigned dedicated public identifier may be assessed, at 722. Assignment of the dedicated public identifier may be assessed by querying the SMS DB 130 based on the internal identifier of the business user 108.

If a dedicated public identifier is already assigned to the business user 108, the dedicated public identifier of the business user 108 may be returned, at 725, after the public identifier is retrieved from the SMS DB 130. Because the public identifier may be dedicated to the business user 108, the public identifier may be used as a sender identifier of the business user 108 for sending the direct message.

If no dedicated public identifier is assigned to the business user 108, an unassigned public identifier dedicated to type-3 business users may be retrieved and may be assigned to the business user 108, at 723, as a dedicated public identifier of the business user 108. Assignment of the public identifier to the business user 108 may be recorded, e.g., in the SMS DB 130. The public identifier assigned to the business user 108 may be returned, at 725, for being used to identify the business user 108 as the sender of the direct message intended to the mobile device 160. In accordance with a further aspect of this disclosure, all of the public identifiers may be pre-assigned by a system administer as part of commissioning the system and, thus, steps 722 and 723 may not be executed.

If the business user 108 is not a type-3 user, other processes may be performed. For example, at 726, whether an association record containing the intended mobile device 160 and the business user 108 exists may be assessed. If yes (i.e., an association exists), the public identifier contained in the association may be returned, at 727. The association may contain a type-1 public identifier or a type-2 public identifier. The business user 108 may be identifiable by the business server 110 based upon a combination of the public identifier and the identifier of the mobile device 160.

If no (i.e., no association containing the intended mobile device 160 and the business user 108 exists), a selected type-1 or type-2 public identifier may be obtained, at 770, and a new association of the business user 108 may be recorded. The new association may associate the business user 108 with a combination of the selected public identifier and the intended mobile device 160. The selected public identifier may be returned, at 729, and used as the sender of the direct message intended to be sent to the mobile device 160.

Figure 11:
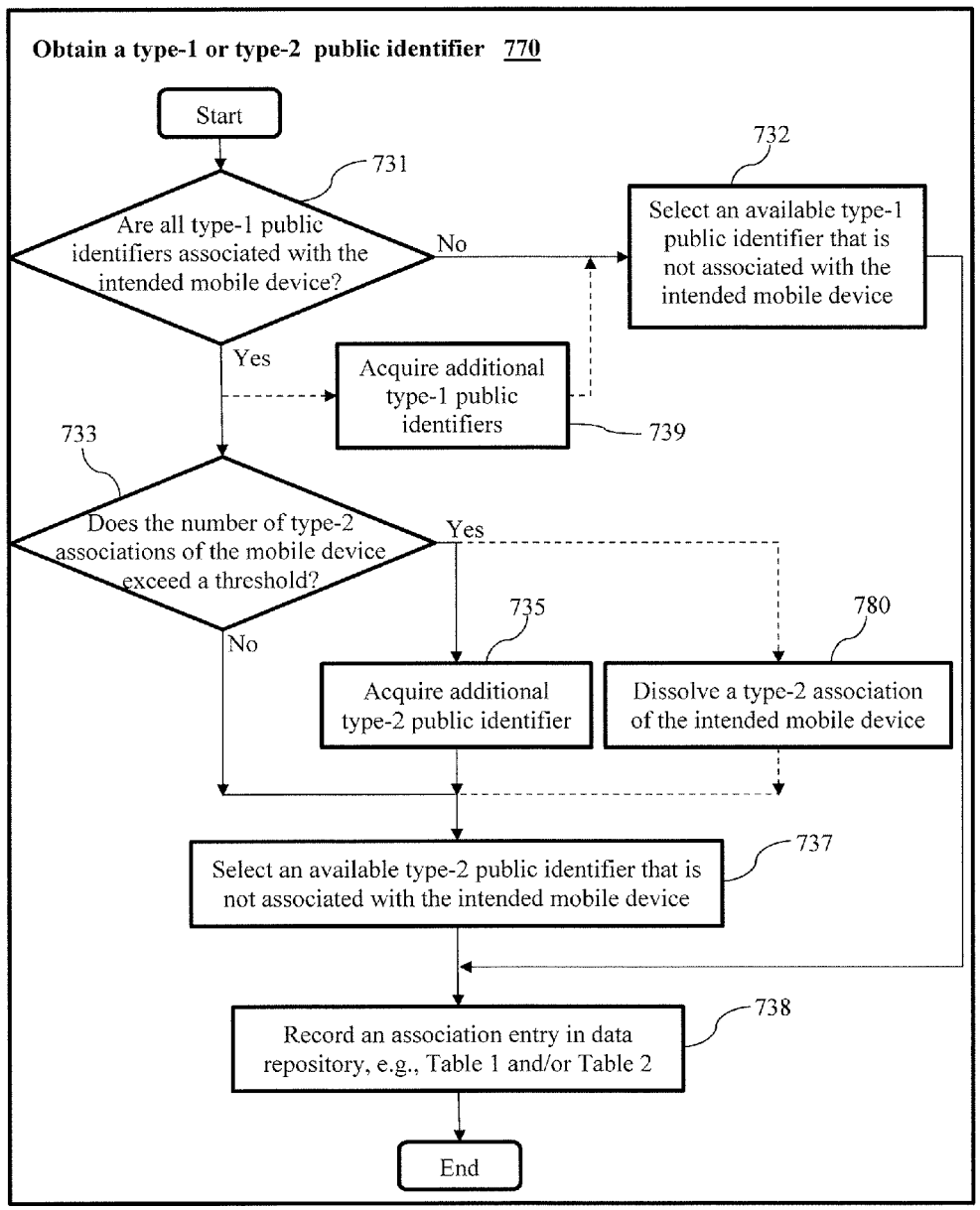

FIG. 11 shows an example of a sub-process of the method 700 of FIG. 10. Turning to FIG. 11, an example process of step 770 of the method 700 is further articulated, i.e., a type-1 or type-2 public identifier may be obtained, at 770, for a business user 108 to send a direct message to an intended mobile device 160. In FIG. 11, the business user 108 may not be a type-3 user and no association containing the business user 108 and the intended mobile device 160 may exist.

At 731, whether all type-1 public identifiers are already associated with the intended mobile device 160 may be assessed. As shown and described herein, each of type-1 or type-2 public identifiers may be associated with more than one mobile device 160. The number of type-1 public identifiers for associating the intended mobile device 160 may be limited, e.g., for cost saving purposes. According to some aspects of this disclosure, a respective mobile device 160 may be associated with available type-1 public identifiers before being associated with type-2 public identifiers.

If not all type-1 public identifiers are associated with the intended mobile device 160, a type-1 public identifier not associated with the intended mobile device 160 may be selected, at 732. As shown and described above, all type-1 public identifiers and/or type-1 public identifiers associated with the intended mobile device 160 may be retrieved from the SMS DB 130. The type-1 public identifier may be selected based on the retrieved results from the SMS DB 130.

If all type-1 public identifiers are associated with the intended mobile device 160, the process may proceed further. At 733, whether the number of type-2 public identifiers associated with the intended mobile device 160 exceeds a predetermined threshold may be assessed. In some cases, the predetermined threshold may be calculated by multiplying the number of all type-2 public identifiers by a predetermined percentage that may be a percentage value selected, e.g., between sixty percent and ninety-five percent. Alternatively, in accordance with a further aspect of this disclosure, the percentage value may be equal to one hundred percent, meaning the total number of type-2 public identifiers.

If yes (the number of type-2 public identifiers associated with the intended mobile device 160 is greater than the predetermined threshold), one additional type-2 public identifier may be acquired, at 735. The additional type-2 public identifiers may, for example, be acquired by renting or purchasing from an SMS system 150 (shown in FIG. 1). Alternatively and/or additionally, a selected type-2 association of the intended mobile device 160 may be dissolved, at 780. The public identifier retrieved from the dissolved association may be made available for associating with the business user 108 and the intended mobile device 160. Additional detail regarding dissolving an association of an intended mobile device 160 will be set forth with reference to FIG. 12.

If the number of type-2 public identifiers associated with the intended mobile device 160 does not exceed the predetermined threshold or when at least one public identifier is made available for associating the business user 108 with the intended mobile device 160, a type-2 public identifier not associated with the intended mobile device 160 may be selected, at 737.

An association for the business user 108 with a combination of the selected public identifier and the intended mobile device 160 may be created and recorded, at 738. The association may be stored in the SMS DB 130 for future queries of association entries.

Alternatively and/or additionally, when all type-1 public identifiers are associated with the intended mobile device 160, additional type-1 public identifiers may be acquired, at 739. The public identifiers may be acquired by renting or purchasing from the SMS system 150 or from any other suitable authority.

Figure 12:
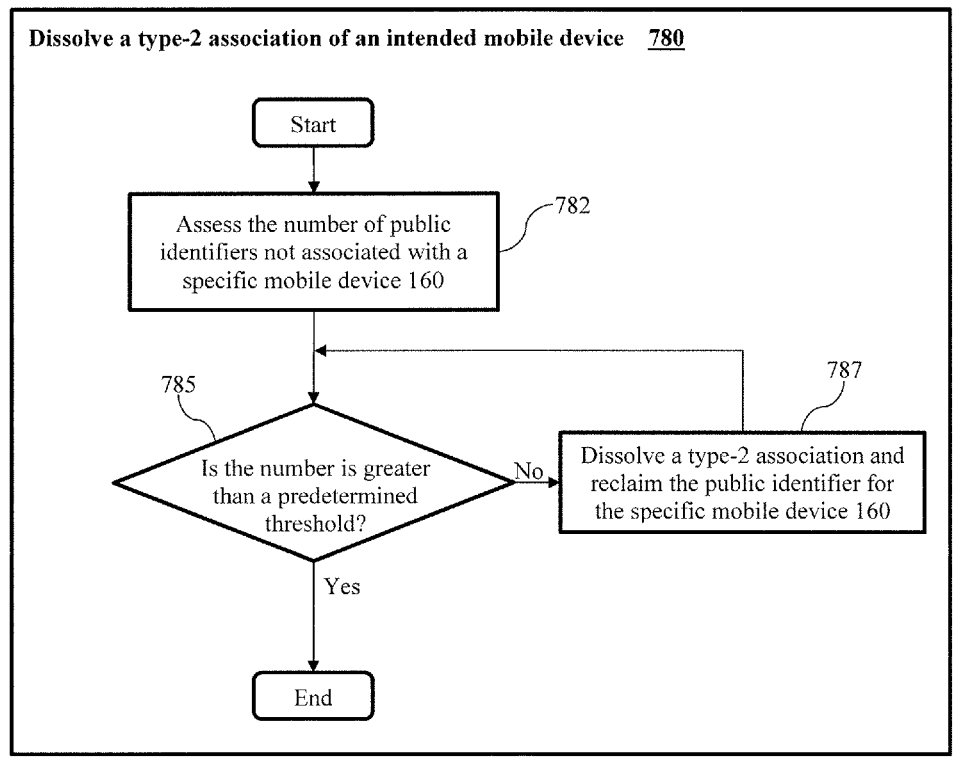

FIG. 12 illustrates an example of a sub-process of the process of FIG. 11. Turning to FIG. 12, an example process of step 780 of the method 700 is further articulated, i.e., a type-2 association of an intended mobile device 160 may be dissolved, at 780. In FIG. 12, the number of public identifiers that are not associated with the intended mobile device 160 may be assessed, at 782.

If the number of public identifiers that are not associated with the intended mobile device 160 is determined to be greater than a predetermined threshold (which may, for example, be zero or greater), at 785, no existing association may be needed to be dissolved. If the number is determined not to be greater than the predetermined threshold, a type-2 association of the intended mobile device 150 may be dissolved, and a public identifier of the association may be reclaimed with respect to the intended mobile device, at 787.

As described herein, a public identifier may be assigned to a type selected from, e.g., three types. Each type-3 public identifier may be permanently assigned to a selected business user 108 and be used to exchange messages with multiple mobile devices 160. Each type-1 public identifier in association with a specific mobile device 160 may be used to permanently and unambiguously identify a specific business user 108. The same public identifier may be used to associate the same business user 108 with another (different) mobile device 160. Each type-2 public identifier may be dynamically associated with or reclaimed from one or more business users 108 and one mobile device 160. A type-2 public identifier may be reclaimed by dissolving an association containing an identifier of the mobile device 160 and the type-2 public identifier.

A given mobile device 160 may have multiple type-2 associations with multiple public identifiers and multiple business users 108. A candidate association to be dissolved, at 787, may be an association that has an oldest last-use timestamp. Alternatively, the candidate association may be an association with the oldest creation timestamp or an association that is older than a predetermined duration threshold.

Figure 13:
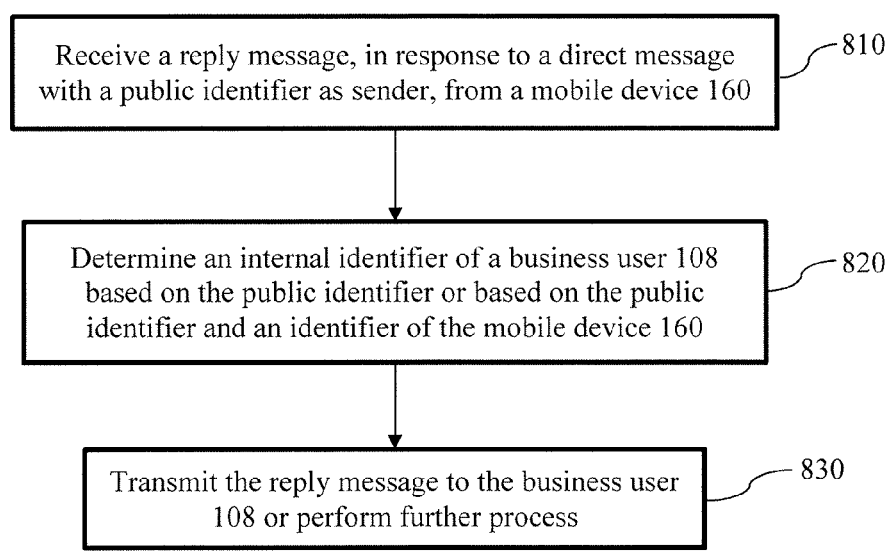
FIG. 13 shows a top-level conceptual block diagram of a further example process that may be performed in the examples of FIGS. 1-6, according to an aspect of this disclosure.

FIG. 13 shows a further example of the method 800. Turning to FIG. 13, a reply message may be received, at 810, e.g., by the SMS system 150 (shown in FIG. 1). The reply message may be sent from a mobile device 160 and intended for a business user 108 using a public identifier. The reply message may include a message text and metadata of the message text. The metadata of the message text may contain sender identification information and recipient identification information, where the sender identification information may be set to an identifier of the mobile device 160 and the recipient identification information may be set to a public identifier for indicating a business user 108.

The business user 108 may be identified, at 820, based on the public identifier or based on the public identifier and an identifier of the mobile device 160, for directing the reply message to the business user 108. An internal identifier of the business user 108 may either be determined by the public identifier or by a combination of the public identifier and the identifier of the mobile device 160, or may be obtained by a further process. Additionally, the intended recipient identification information contained in the metadata of the reply message may be set to the internal identifier of the business user 108. Additional detail regarding the identifying of the business user 108 will be provided with reference to FIG. 14.

The reply message may be transmitted to the identified business user 108, at 830, or a further process may be performed, depending on whether the business user 108 is determined at 820. Because the identified business user 108 may be uniquely identified within the business server 110 (shown in FIG. 1), the reply message may be routed to the business user 108 with no ambiguity. If the business user 108 is not determined at 820, further information may be requested by the business server 110 from the mobile device 160. Additional detail regarding the requesting of further information will be provided with reference to FIG. 15.

Figure 14:
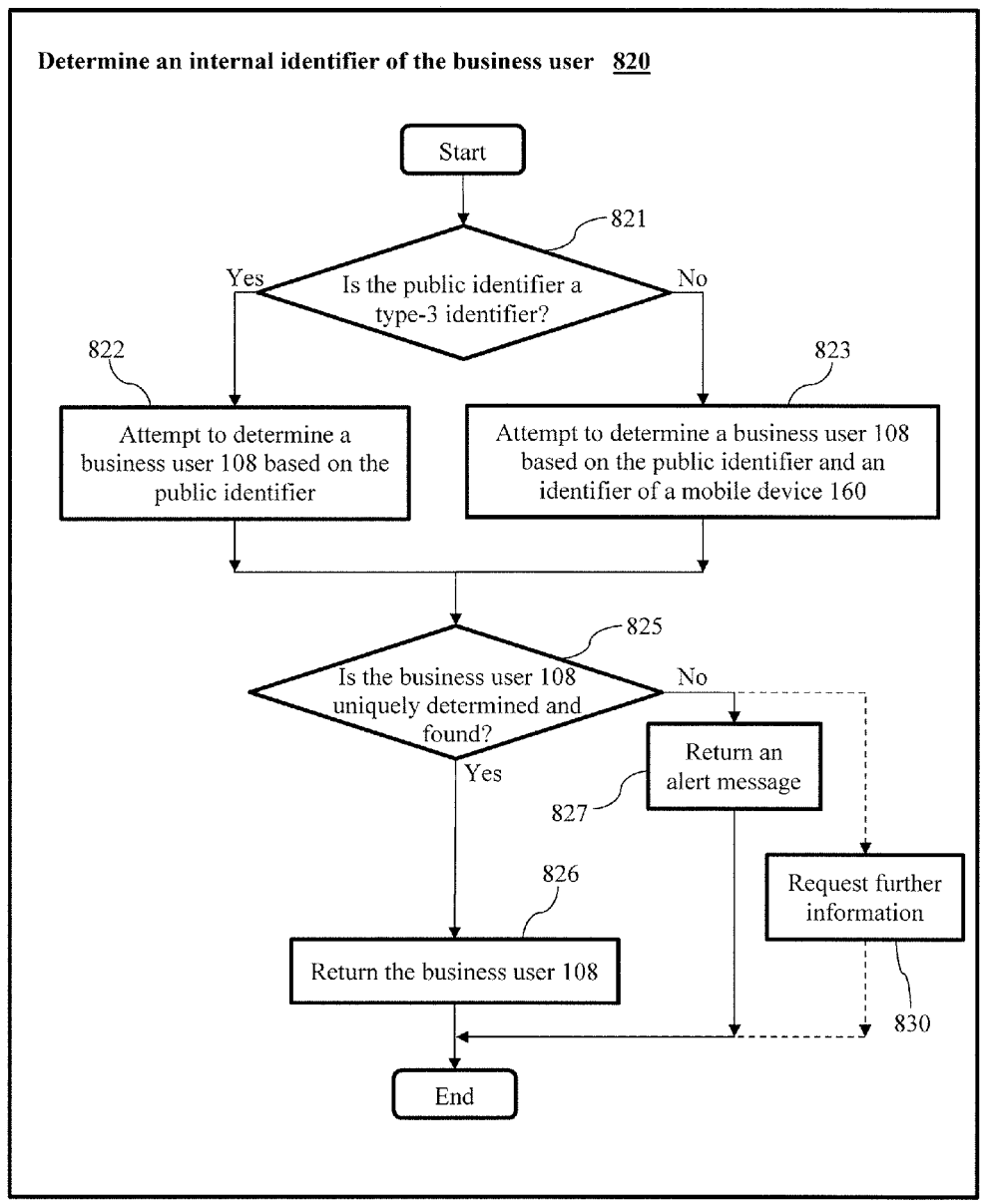
FIGS. 14-15 show conceptual flowcharts of various examples of FIG. 10, according to aspects of this disclosure.

FIG. 14 shows an example of the method 800 of FIG. 13. Turning to FIG. 14, an example process of step 820 of the method 800 is further articulated, i.e., the business user 108 may be identified based on the public identifier or the public identifier and an identifier of the mobile device 160. In FIG. 14, whether the public identifier is a type-3 identifier may be assessed, at 821. The public identifier may be assessed by querying an SMS DB 130 (shown in FIG. 1).

If the public identifier is determined to be a type-3 identifier, an internal identifier of the business user 108 may be determined based on the public identifier, at 822. If the public identifier is determined not to be a type-3 identifier, the internal identifier of the business user 108 may be determined based on the public identifier and the identifier of the mobile device 160, at 823. In either cases, the internal identifier of the business user 108 may be determined by querying the SMS DB 130.

At 825, whether the business user 108 is found in the SMS DB 130 may be assessed. If the business user 108 is uniquely determined and found, the internal identifier of the business user 108 may be returned, at 826. The identifier may be used in routing and delivering a reply message sent by the mobile device 160 to the business user 108. If the intended business user 108 cannot be determined or cannot be found, at 825, an alert message may be returned, at 827, to a user of the mobile device 160. The alert message may say, e.g., "could not determine intended recipient". Alternatively and/or additionally, further information may be requested, at 830, for determining the intended business user 108. Additional detail regarding the requesting the further information will be provided with reference to FIG. 15.

Figure 15:
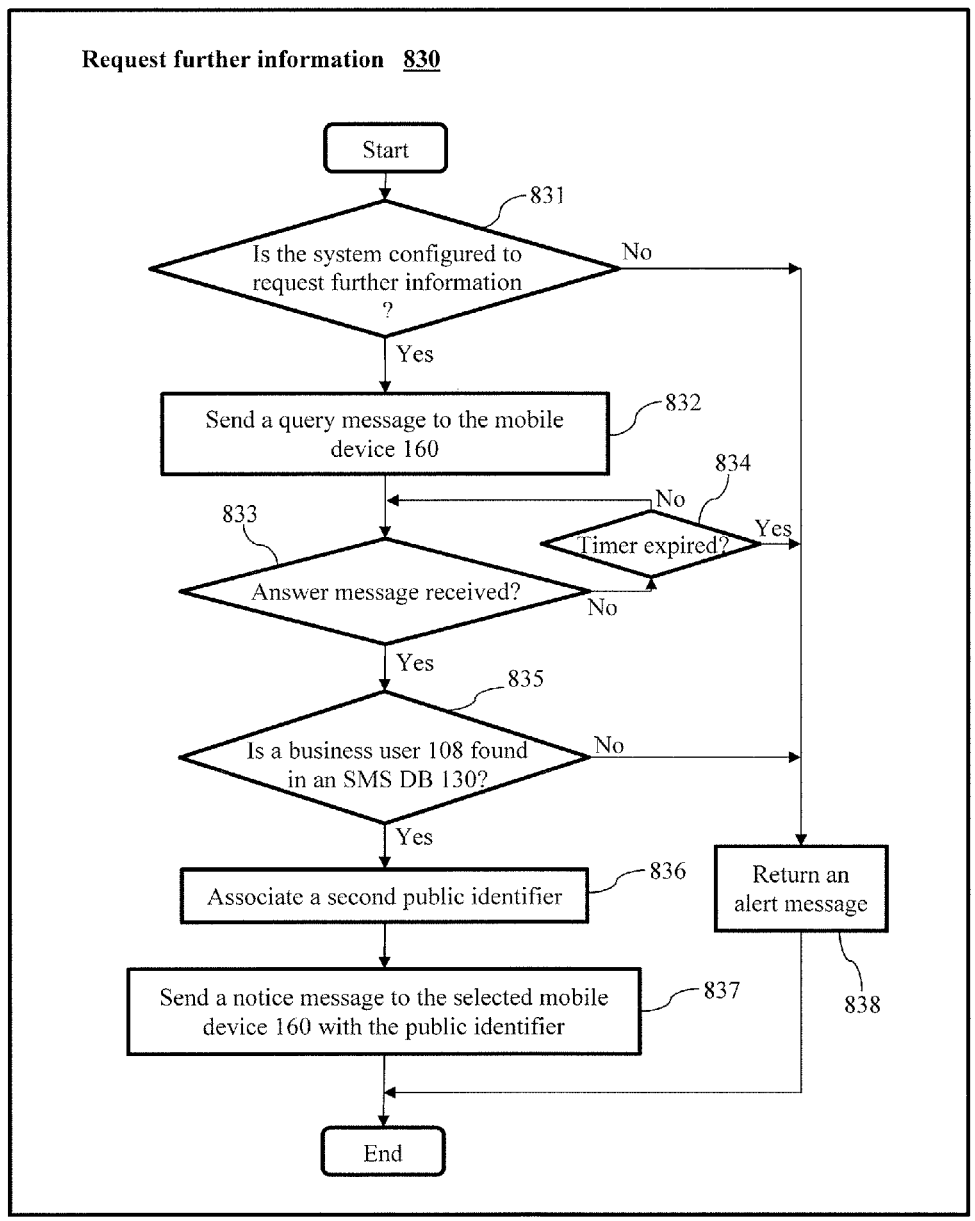

FIG. 15 shows an example of the sub-process of method 800 of FIG. 14. Turning to FIG. 15, an example process of step 830 of the method 800 is further articulated, i.e., further information may be requested for determining an intended business user 108 when the intended business user 108 may not be determined by the sub-process of FIG. 14. The further information may be requested from the mobile device 160, e.g., by a business server 110 (shown in FIG. 1). At 831, whether a business messaging system 100 (shown in FIG. 1) is configured to request further information when the intended business user 108 is not found may be assessed, at 831. If the business messaging system 100 is not configured to request further information, an alert message may be returned, at 838, to a user of the mobile device 160. The alert message may say, e.g., "We cannot deliver your message to the intended recipient". Such configuration may provide a security that prevents an unknown user of the mobile device 160 from sending unsolicited messages to the business users 108.

If the business messaging system 100 is configured to request further information, a query message may be sent back to the mobile device 160, at 832, for more information about the business user 108 for whom the reply message is intended. For example, if the public identifier is "111-111-1111", the alert message may say "Your message to 111-111-1111 cannot be delivered; please provide the user ID of the intended recipient for your message."

An answer in response to the query message is expected, at 833. If the answer is received from the mobile device 160, the SMS DB 130 may be further queried for the intended business user 108 based on a content of the answer. For example, if an internal identifier is provided by the mobile device 160 within a predetermined time window, the internal identifier may be verified via querying the SMS DB 130. If no business user 108 that matches the internal identifier can be found in the SMS DB 130, or if no answer is received in response to the query message after a predetermined duration, the sub-process may be terminated. An alert message may be returned to the mobile device 160, at 838. The alert message may say, e.g., "System: message was not delivered."

Alternatively and/or additionally, if no answer is received in response to the query message after a predetermined duration, another query message may be sent to the mobile device 160 (not shown). In such a case, the alert message, e.g., "System: message is not delivered", may be delivered to the mobile device 160 after a predetermined number of query messages.

If a business user 108 is found from the SMS DB 130, at 835, based on the answer, a second public identifier may be associated with the intended business user 108 and the identifier of the mobile device 160. A notice message may be sent to the mobile device 160, at 837, with the associated second public identifier. For example, if the second public identifier is "222-222-2222", the notice message may say "System: please use '222-222-2222' as recipient user ID for sending future messages." The associated second public identifier may be used by the mobile device 160 to exchange further messages with the business user 108.

Although the aspects of this disclosure presented above shown and described an SMS messaging system for purpose of illustration, those skilled in the art would recognize that the invention may extend to other messaging systems, including, but not limited to, other text, voice video messaging systems, and any business/enterprise communication systems. Additionally, those skilled in the art would recognize that, for a purpose of this disclosure, "text" and "SMS" are interchangeable without departing from the scope and spirit of the invention in its various aspects.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A system for exchanging messages between a business user and one or more mobile devices, comprising:
   a business server configured to exchange messages with the business user and to obtain a public identifier for the business user to enable duplex message exchange between the business user and a respective mobile device selected from the mobile devices; and
   a short message service ("SMS") application programming interface ("API") communicatively coupled to said business server for interacting with an SMS system that serves the mobile devices,
   wherein said business server serves a number of business users using a number of public identifiers, and
   wherein the number of public identifiers is smaller than the number of business users.

2. The system of claim 1, wherein the business server is configured to retrieve the public identifier based upon a pre-existing association containing an internal identifier of the business user and an identifier of the respective mobile device or, if no pre-existing association exists, to associate the internal identifier of the business user with a combination of the identifier of the respective mobile device and a selected public identifier that is not previously associated with the identifier of the respective mobile device.

3. The system of claim 1, wherein said business server is configured to associate a fixed public identifier with the business user for sending a direct message to a user of the respective mobile device if not all fixed public identifiers are associated with the respective mobile device, and wherein the business user is identifiable by a combination of the fixed public identifier and an identifier of the respective mobile device.

4. The system of claim 1, wherein said business server is configured to assign the business user a temporary association with the respective mobile device based upon a messaging need, wherein an internal identifier of the business user is identifiable by a combination of the public identifier and an identifier of the respective mobile device.

5. The system of claim 1, wherein said business server is configured to switch to associating a temporary public identifier when a predetermined number of fixed public identifiers for the respective mobile device is reached.

6. The system of claim 1, wherein the business server is configured to retrieve a public identifier if an association record containing an internal identifier of the business user and an identifier of the respective mobile device is found when a message is received for sending to the respective mobile device.

7. The system of claim 1, wherein the business server is configured to retrieve an internal identifier of the business user if an association record of a combination of a public identifier and an identifier of the respective mobile device is found when a message is received for sending to the business user using the public identifier.

8. The system of claim 1, wherein said business server is configured to:
   count the number of available public identifiers not associated with the respective mobile device; and
   based on the counted number, increase the number of the public identifiers by acquiring more public identifiers or make an existing public identifier available for a new association by dissolving an existing association of the respective mobile device with a public identifier.

9. The system of claim 1, wherein said business server is configured to dissolve a temporary association of the respective mobile device with a public identifier when the temporary association has an oldest last-use timestamp.

10. The system of claim 1, wherein said business server is configured to add a prefix, a suffix or a combination thereof to message text to enable duplex message exchange between the business user and the respective mobile device.

11. The system of claim 1, wherein said business server is configured to block a message intended for the business user from the respective mobile device if there is no association containing an internal identifier of the business user and an identifier of the respective mobile device.

12. A method for a business server to exchange messages between a business user and one or more mobile devices, comprising:
   obtaining a public identifier for the business user to enable duplex message exchange between the business user and a respective mobile device selected from the mobile devices; and
   sending the direct message from the business user to the respective mobile device using the public identifier as a sender identifier,
   wherein the business server serves a number of business users using a number of public identifiers, and
   wherein the number of public identifiers is smaller than the number of business users.

13. The method of claim 12, wherein said obtaining the public identifier comprises:
   retrieving the public identifier based upon an association with an internal identifier of the business user and an identifier of the respective mobile device; or
   associating an internal identifier of the business user with a combination of the identifier of the respective mobile device and a public identifier.

14. The method of claim 12, wherein said obtaining the public identifier comprises:
   associating a fixed public identifier with the business user for sending a direct message to a user of the respective mobile device if not all fixed public identifiers are associated with the respective mobile device,
   wherein an internal identifier of the business user is identifiable by a combination of the fixed public identifier and an identifier of the respective mobile device.

15. The method of claim 12, wherein said obtaining the public identifier comprises:
   assigning the business user a temporary association with a respective public identifier and the respective mobile device based upon a need reflected by a direct message to be sent by the business user and intended for the respective mobile device,
   wherein the business user is identifiable by a combination of the respective public identifier and the respective mobile device.

16. The method of claim 12, further comprising switching to associating a temporary public identifier with an identifier of the respective mobile device when a predetermined number of fixed identifiers associated with the respective mobile device is reached.

17. The method of claim 12, further comprising retrieving an internal identifier of the business user if an association record of a combination of the public identifier and an identifier of the respective mobile device is found when a message is received for sending to the business user using the public identifier.

18. The method of claim 12, further comprising:
   counting the number of available public identifiers not associated with the respective mobile device; and
   based upon a result of the counting, increasing the number of the public identifiers by acquiring more public identifiers or making an existing public identifier available for a new association by dissolving an association of the respective mobile device.

19. The method of claim 12, further comprising dissolving a temporary association of the respective mobile device when the association has an oldest last-use timestamp.

20. The method of claim 12, further comprising:
   accessing a business user directory; and
   blocking messages intended a for business user, if there is no association containing an internal identifier of the business user and an identifier of the respective mobile device.

21. The method of claim 12, further comprising adding a prefix, a suffix or a combination thereof to the direct message to enable duplex message exchange between the business user and the respective mobile device.

22. A non-transitory computer storage medium of a business server including at least one program containing executable instructions designed to implement operations, comprising:
   obtaining a public identifier for a business user to enable duplex message exchange between the business user and a respective mobile device selected from the mobile devices; and
   sending the direct message from the business user to the respective mobile device using the public identifier as a sender identifier,
   wherein the business server serves a number of business users using a number of public identifiers, and
   wherein the number of public identifiers is smaller than the number of business users.

23. The non-transitory computer storage medium of claim 22, wherein said obtaining the public identifier comprises:
   retrieving the public identifier based upon an association with an internal identifier of the business user and an identifier of the respective mobile device; or
   associating the internal identifier of the business user with a combination of the identifier of the respective mobile device and a public identifier.

24. The non-transitory computer storage medium of claim 22, wherein said obtaining the public identifier comprises:
   associating a fixed public identifier with the business user for sending a direct message to the respective mobile device if not all fixed public identifiers are associated with the respective mobile device,
   wherein an internal identifier of the business user is identifiable by a combination of the fixed public identifier and an identifier of the respective mobile device.

25. The non-transitory computer storage medium of claim 22, wherein said obtaining the public identifier comprises:
   assigning the business user a temporary association with a respective public identifier and the respective mobile device based upon a need reflected by a direct message to be sent by the business user and intended for the respective mobile device,
   wherein an internal identifier of the business user is identifiable by a combination of the respective public identifier and an identifier of the respective mobile device.

26. The non-transitory computer storage medium of claim 22, wherein for the operations further include switching to associating a temporary public identifier with an identifier of the respective mobile device when a number of fixed public identifiers associated with the respective mobile device is reached.

27. The non-transitory computer storage medium of claim 22, wherein for the operations further include retrieving an internal identifier of the business user if an association record of a combination of the public identifier and an identifier of the respective mobile device is found when a message is received for sending to the business user using the public identifier.

28. The non-transitory computer storage medium of claim 22, wherein for the operations further include:
- counting the number of available public identifiers not associated with the respective mobile device; and
- based on a result of the counting, increasing the number of the public identifiers by acquiring more public identifiers or making an existing public identifier available for a new association by dissolving an association of the respective mobile device.

29. The non-transitory computer storage medium of claim 22, wherein the operations further include dissolving a temporary association of the respective mobile device when the association has an oldest last-use timestamp.

* * * * *